(12) United States Patent
Monsen

(10) Patent No.: US 7,590,204 B2
(45) Date of Patent: Sep. 15, 2009

(54) TECHNIQUE FOR ADAPTIVE EQUALIZATION IN BAND-LIMITED HIGH DATA RATE COMMUNICATION OVER FADING DISPERSIVE CHANNELS

(76) Inventor: Peter Monsen, 370 Hollow View Rd, Stowe, VT (US) 05672

( * ) Notice: Subject to any disclaimer, the term of this patent is extended or adjusted under 35 U.S.C. 154(b) by 615 days.

(21) Appl. No.: 11/348,816

(22) Filed: Feb. 6, 2006

(65) Prior Publication Data

US 2006/0182193 A1   Aug. 17, 2006

Related U.S. Application Data

(60) Provisional application No. 60/653,225, filed on Feb. 14, 2005.

(51) Int. Cl.
*H04B 1/10* (2006.01)
(52) U.S. Cl. ...................................... 375/350
(58) Field of Classification Search ................. 375/229, 375/233, 260, 267, 285, 340, 346–350
See application file for complete search history.

(56) References Cited

U.S. PATENT DOCUMENTS

| 4,112,370 A | 9/1978 | Monsen |
| 4,328,585 A | 5/1982 | Monsen |

(Continued)

FOREIGN PATENT DOCUMENTS

EP   0 650 271 A2   4/1995

OTHER PUBLICATIONS

Least Square Estimation With Application to Digital Signal Processing, A.A. Giordano and F.M. Hsu, John Wiley and Sons, New York, NY, 1985, Chapter 3.3.

(Continued)

*Primary Examiner*—Khanh C Tran
(74) *Attorney, Agent, or Firm*—Edwards Angell Palmer & Dodge LLP; Peter J. Manus

(57) ABSTRACT

In high data rate communication applications where digital data information is error-corrected coded and interleaved and transmitted with spectral limitations over fading dispersive channels, a method and receiver is described that incorporates channel estimation and decision-feedback equalization. Channel estimation is accomplished within a receiver time block with locally generated reference symbol sequences. The parameters of the decision-feedback equalizer (DFE) are computed directly from the channel estimates. The DFE is an optimum finite length realization that includes effects from spectrum control filtering, a space-time block coder (STBC) on multiple transmit antennas, multiple receiver diversity signals, and the fading dispersive channel. The DFE includes a matched filter, forward filter, backward filter, and detector. A symbol combiner within the matched filter produces a P+1 dimensional signal that provides ideal cancellation of P intersymbol interferers in the forward filter. When P is selected to meet an intersymbol interference (ISI) criterion, all desired signal energy is collected and all ISI can be ideally cancelled. The DFE processes received signals within the receiver time block to produce information symbol estimates that are subsequently deinterleaved and error-correction decoded to recover the transmitted digital data information. Deinterleaving over multiple receiver time blocks further compensates for channel estimation variations from block to block. Additionally the STBC and DFE are used in a quadruple angle diversity technique requiring only a single antenna at each terminal of a troposcatter link to provide performance approaching that of a nonfading satellite link.

26 Claims, 8 Drawing Sheets

U.S. PATENT DOCUMENTS

| | | | |
|---|---|---|---|
| 4,365,338 A | 12/1982 | McRae et al. | |
| 4,644,562 A | 2/1987 | Kavehrad et al. | |
| 5,220,320 A | 6/1993 | Assal et al. | |
| 5,513,215 A | 4/1996 | Marchetto | |
| 5,563,610 A | 10/1996 | Reudink | |
| 5,590,399 A | 12/1996 | Matsumoto et al. | |
| 5,596,333 A | 1/1997 | Bruckert | |
| 5,619,503 A | 4/1997 | Dent | |
| 5,680,419 A | 10/1997 | Bottomley | |
| 5,736,959 A | 4/1998 | Patterson et al. | |
| 5,838,742 A | 11/1998 | Abu-Dayya | |
| 5,987,037 A | 11/1999 | Gans | |
| 6,157,811 A | 12/2000 | Dent | |
| 7,336,727 B2* | 2/2008 | Mukkavilli et al. | 375/299 |
| 2002/0196842 A1* | 12/2002 | Onggosanusi et al. | 375/148 |
| 2005/0047515 A1* | 3/2005 | Walton et al. | 375/267 |

OTHER PUBLICATIONS

"Adaptive Equalization and Interference Cancellation for Wireless Communication Systems", B.C.W. Lo and K.B. Letaief, IEEE Transactions on Communications, vol. 47, No. 4, Apr. 1999, pp. 538-545.

"An Algorithm For Reducing the Bandwidth and Profile of a Sparse Matrix", N.E. Gibbs, W.G. Poole, Jr., and P.K. Stockmeyer, Siam J. Numer.Anal., vol. 13, No. 2, Apr. 1976, pp. 236-250.

Mobile Station-Base Station Compatibility Standard for Dual-Mode Wideband Spread Spectrum Cellular System, TIA/EIA/IS-95-A, 1992. (Abstract Only).

"Blind Adaptive Multiuser Detection", M. Honig, U. Madhow, and S. Verdu, IEEE Transactions on Information Theory, vol. 41, No. 4, Jul. 1995, pp. 944-960.

"Feedback Equalization for Fading Dispersive Channels", P. Monsen, IEEE Transactions on Information Theory, Jan. 1971, pp. 56-64.

"Block Channel Equalization in the Presence of a Cochannel Interferent Signal", A. Ginesi, M. Vitetta, and D.D. Falconer, IEEE Journal on Selected Areas in Communications, vol. 17, No. 11, Nov. 1999, pp. 1853-1862.

"A Family of Multiuser Decision-Feedback Detectors for Asynchronous Code-Division Multiple-Access Channels", A. Duel-Hallen, IEEE Transactions on Communications, vol. 43, No. 2/3/4, Feb./Mar./Apr. 1995, pp. 421-434.

"Minimum Probability of Error for Asynchronous Gaussian Multiple-Access Channels", S. Verdu, IEEE Transactions on Information Theory, vol. IT-32, No. 1, Jan. 1986, pp. 85-96.

"Decision Feedback Equalization for CDMA in Indoor Wireless Communications", M. Abdulrahman, A.U.H. Sheikh, and D.D. Falconer, IEEE Journal on Selected Areas in Communications, vol. 12, No. 4, May 1994, pp. 698-706.

"Adaptive Space-Time Feedforward/Feedback Detection for High Data Rate CDMA in Frequency-Selective Fading", J.E. Smee and S.C. Schwartz, IEEE Transactions on Communications, vol. 49, No. 2, Feb. 2001, pp. 317-328.

"Linear Multiuser Detectors for Synchronous Code-Division Multiple-Access Channels", R. Lupas and S. Verdu, IEEE Transactions on Information Theory, vol. 35, No. 1, Jan. 1989, pp. 123-136.

"Performance Analysis of Minimum Variance CDMA Receivers", M.K. Tsatsanis and Z. Xu, IEEE Transactions on Signal Processing, vol. 46, No. 11, Nov. 1998, pp. 3014-3022.

"Decorrelatng Decision-Feedback Multiuser Detector for Synchronous Code-Division Multiple-Access Channel", A. Duel-Hallen, IEEE Transactions on Communications, vol. 41, No. 2, Feb. 1993, pp. 285-290.

"Information-Theoretic Considerations for Symmetric, Cellular, Multiple-Access Fading Channels—Part I", S. Shamai and A.D. Wyner, IEEE Transactions on Information Theory, vol. 43, No. 6, Nov. 1997, pp. 1877-1894.

"Dynamic Channel Assignment in High-Capacity Mobile Communications Systems", D.C. Cox and D.O. Reudink, The Bell System Technical Journal, vol. 50, No. 6, Jul.-Aug. 1971, pp. 1833-1857.

"Tracking of Time-Varying Mobile Radio Channels—Part I: The Wiener LMS Algorithm", L. Lindbom, M. Sternad, and A. Ahlen, IEEE Transactions on Communications, vol. 49, No. 12, Dec. 2001, pp. 2207-2217.

"Blind Multiuser Detection: A Subspace Approach", X. Wang and H.V. Poor, IEEE Transactions on Information Theory, vol. 44, No. 2, Mar. 1998, pp. 677-690.

"MMSE Equalization of Interference on Fading Diversity Channels", P. Monsen, IEEE Transactions on Communications, vol. COM-32, No. 1, Jan. 1984, pp. 5-12.

"MMSE Equalization of Interference on Fading Diversity Channels", P. Monsen, IEEE Conference on Communications, Conference Record, vol. 1, Denver, CO, Jun. 1981, pp. 12.2-1-12.2-5.

"Adaptive Receiver Structures for Asynchronous CDMA Systems", P.B. Rapajic and B.S. Vucetic, IEEE Journal on Selected Areas in Communications, vol. 12, No. 4, May 1994, pp. 685-697.

"Channel Equalization for Block Transmission Systems", G.K. Kaleh, IEEE Journal on Selected Areas in Communications, vol. 13, No. 1, Jan. 1995, pp. 110-121.

"On Multipath Channel Estimation for CDMA Systems Using Multiple Sensors", C. Sengupta, J.R. Cavallaro, and B. Aazhang, IEEE Transactions on Communications, vol. 49, No. 3, Mar. 2001, pp. 543-553.

"An Adaptive Receiver for Digital Signalling Through Channels With Intersymbol Interference", J.G. Proaxis and J.H. Miller, IEEE Transactions on Information Theory, vol. IT-15, No. 4, Jul. 1969, pp. 484-497.

"Maximum-Likelihood Sequence Estimation of Digital Sequences in the Presence of Intersymbol Interference," G. David Forney, Jr., IEEE Transactions on Information Theory, vol. IT-18, No. 3, pp. 363-378, May 1972.

"A Simple Transmit Diversity Technique for Wireless Communications," Siavash M. Alamouti, IEEE Journal on Select Areas in Communications, vol. 16, No. 8, pp. 1451-1458, Oct. 1998.

"Megabit Digital Troposcatter Subsystem," C.J. Grzenda, D.R. Kern, and P. Monsen, Proc. Natl Telecommunication Conf., pp. 28-15 to 28-19, New Orleans LA, Dec. 1975.

"Adaptive Equalization of the Slow Fading Channel," P. Monsen, IEEE Transactions on Communications, vol. Com-22, No. 8, pp. 1064-1075, Aug. 1974.

"MMSE Decision-Feedback Equalizers: Finite-Length Results," N. Al-Dhahir and J.M. Cioffi, IEEE Transactions on Information Theory, vol. 41, No. 4, pp. 961-975, Jul. 1995.

"Fast Computation of Channel-Estimate Based Equalizers in Packet Data Transmission," N. Al-Dhahir, J.M. Cioffi, IEEE Transactions on Signal Processing, vol. 43, No. 11, pp. 2462-2473, Nov. 1995.

"Performance Evaluation and Analysis of Space-Time Coding in Unequalized Multipath Fading Links," Y. Gong and K.B. Letaief, IEEE Transactions on Communications, vol. 48, No. 11, pp. 1778-1782, Nov. 2000.

"Multiple Input/Multiple Output (MIMO) Equalization for Space-Time Block Coding," W. Choi and J.M. Cioffi, Proc. IEEE Pacific Rim Conf. Communications, Computers, Signal Processing, pp. 341-344, 1999.

"Finite-Length MIMO Decision Feedback Equalization for Space-Time Block-Coded Signals Over Multipath-Fading Channels," N. Al-Dhahir, A.F. Naguib, and A.R. Calderbank, IEEE Transactions on Vehicular Technology, vol. 50, No. 4, pp. 1176-1182, Jul. 2001.

"Transmit Diversity and Linear and Decision-Feedback Equalizations for Frequency-Selective Fading Channels," L. Li, Y. Yao, and H. Li, IEEE Transactions on Vehicular Technology, vol. 52, No. 5, pp. 1217-1231, Sep. 2003.

"Equalization Concepts for Alamouti's Space-Time Block Code," W.H. Gerstacker, F. Obernosterer, R. Schober, A.T. Lehmann, A. Lampe, and P. Gunreben, IEEE Transactions on Communications, vol. 52, No. 7, pp. 1178-1190, Jul. 2004.

Tropospheric Scatter Communications, P. Monsen, Wiley Encyclopedia of Telecommunications, John Wiley & Sons, New York, New York.

"Theoretical and Measured Performance of a DFE Modem on a Fading Multipath Channel," P. Monsen, IEEE Transactions on Communications, vol. COM-25, No. 10, Oct. 1977.

"5/15 GHZ Scattering Study," AD-A236 350, R. Crane, Rome Lab., Griffiss Air Force Base, NY 13441, May 1991.

"Coding for Channels with Feedback," J.M. Ooi, Kluwer Academic Publishers, Boston, MA 1998, p. 4, section 3.5.2.

* cited by examiner

TECHNIQUE FOR ADAPTIVE EQUALIZATION IN BAND-LIMITED HIGH DATA RATE COMMUNICATION OVER FADING DISPERSIVE CHANNELS

CROSS-REFERENCE TO RELATED APPLICATIONS

This application claims priority under 35 USC 119(e) of U.S. provisional application Ser. No. 60/653,225 filed Feb. 14, 2005, the disclosure of which is incorporated herein by reference.

FIELD OF INVENTION

The present invention relates to bandwidth-limited high data rate communication over fading channels that are dispersive in both time and frequency and, more particularly, to improvements in such communication in which channel estimation is used to estimate the time-varying channel and a decision-feedback equalizer is used to compensate for frequency-selective dispersive effects by combining diversity components and reducing intersymbol interference.

BACKGROUND OF THE INVENTION

Data communication in systems where channel conditions include time varying reflections and/or scattering of the transmitted signal wave is generally more difficult than in systems where a time-invariant signal path exists between the transmitter and the receiver. Fading results when multiple paths from random reflections and/or scattering combine to cancel much of the transmitted signal. A fading channel is said to be dispersive in frequency if the fading is not constant over the signal band of interest. A frequency-dispersive channel when excited by an impulse function in time produces multipath delayed received signals spread out in the delay dimension. The average power of these multipath delayed signals versus delay represents the multipath profile of the frequency dispersive channel. The twice-standard deviation $2\sigma_D$ in units of time is a statistical measure of the delay spread of the fading channel. A fading channel is said to be dispersive in time if the fading changes with time. A time-dispersive channel when excited by a sinusoid produces multiple received signals spread out in the frequency dimension. Analogous to the delay spread, the twice-standard deviation $2\sigma_f$ in Hz of the average power vs. frequency profile is a measure of the frequency spread.

Because of the fading, weak signal-to-noise ratio conditions will occur at the receiver so communication techniques in this application are generally restricted to modulation choices with a small number of bits per modulation symbol. Practical systems use Quadrature Phase-Shift-Keying (QPSK) with 2 bits per symbol and 8 Phase-Shift-Keying (8PSK) with 3 bits per symbol. High data rates then can only be realized with corresponding high modulation symbol rates. This results in a symbol period T that can be less than the delay spread $2\sigma_D$ and a symbol rate 1/T that is much greater than the frequency spread $2\sigma_f$. The frequency selective fading when $2\sigma_D/T$ is near or exceeds unity results in intersymbol interference (ISI) and a potential for additional diversity. The high symbol rate with $1/T \gg 2\sigma_f$ insures that there are many symbols within an interval where the fading is not changing. Under this condition adaptation by estimating either the channel or receiver processor parameters is possible.

The weak signal-to-noise ratio conditions also often require additional redundant, i.e., diversity, paths. For example, space diversity is achieved with redundant paths provided by extra antennas and frequency diversity is achieved with redundant paths provided by additional signal bands with the same transmitted signal information. When the diversity is realized by multipath effects associated with the frequency dispersive fading, it is referred to as implicit diversity because it is inherent in the channel. In contrast explicit diversity systems such as space or frequency are at the communication designer's discretion.

Examples of fading dispersive channels include tropospheric scatter (troposcatter) systems, high frequency (HF) ionospheric systems, and cellular radio systems where the reflections and scattering are produced by buildings, trees, and other physical objects. Nominal spread values for these example systems are

|  | Delay Spread $2\sigma_D$ (1E-6 sec.) | Frequency Spread $2\sigma_f$ (Hz) |
|---|---|---|
| Troposcatter | 0.2 | 1.0 |
| HF | 1000.0 | 0.1 |
| Cellular | 4.0 | 10.0 |

One observes, for example, a high data rate system with $T < 2\sigma_D$ and $1/T \gg 2\sigma_f$ in an HF system would not be a high data rate system in a troposcatter or cellular system.

In these radio system fading channel applications, the transmitted high data rate is generally required to be contained within a certain frequency band allocation. Limitation of spectral emissions is generally accomplished with a spectrum control transmitter filter. With present technology the filter can be realized as a Finite impulse response (FIR) filter with multiple coefficients per symbol and a filter span of multiple symbols. The spectrum control filter can be designed so that there is no ISI when the fading channel is not frequency dispersive. However under general fading dispersive conditions ISI is produced that is due to the combination of the spectrum control filter and the frequency dispersive channel.

In *Feedback Equalization for Fading Dispersive Channels*, P. Monsen, IEEE Trans. On Information Theory, pp. 56-64, January 1971, (hereafter Feedback Equalization) the optimum infinite length Decision-Feedback Equalizer (DFE) is developed under a Minimum Mean-Square-Error (MMSE) criterion. The length corresponds to the number of taps on a tapped-delay-line (TDL) filter. Additionally a finite length DFE is presented and an adaptation method based on a stochastic gradient technique is used to track the time-dispersive effects. The infinite length DFE contains a matched filter and forward TDL filter combination that processes the received signal and a backward TDL filter that processes receiver decisions. The forward and backward TDL filters have tap spacing equal to the symbol period T. The optimum solution requires that the forward TDL filter be of infinite length. In a suboptimum but finite solution in Feedback Equalization the matched filter/forward TDL filter combination is realized with a single finite length TDL filter with tap spacing equal to the Nyquist interval 1/B, where for practical systems 1/B<T. This truncated finite length DFE is suboptimum because the number of intersymbol interferers is equal to or greater than the symbol dimensions of the 1/B TDL filter so that all interference can only be cancelled in the infinite length limit. Notwithstanding this limitation, the finite length DFE in Feedback Equalization was shown to be able to cope with the ISI produced by the delay spread while extracting implicit diversity with the important result that the net effect of the frequency selective fading was to improve performance rather than degrade it.

In *Maximum-likelihood sequence estimation of digital sequences in the presence of intersymbol interference*, G. D. Forney Jr., IEEE Trans. On Information Theory, pp. 363-378, May 1972 the Maximum Likelihood Sequence Estimator (MLSE) was developed for the general ISI problem. The MLSE is more complex but superior to the DFE because the MLSE optimization is based on bit error rate probability rather than MMSE. This superiority is most important in channels with nearly perfect ISI cancellation. However it has been shown in studies, for example *Adaptive equalization of the slow fading channel*, P. Monsen, IEEE Trans. Communications, August 1974, that these types of perfect ISI canceling channels do not occur that often in fading channel applications and there is little or no advantage of using the more complex MLSE technique.

The suboptimum finite length DFE of Feedback Equalization was developed in a military troposcatter application, *Megabit digital troposcatter subsystem*, C. J. Grzenda, D. R. Kern, and P. Monsen, Proc. Natl Telecommunication Conf., pp. 28-15 to 28-19, New Orleans La., December 1975. This DFE modem operated in a quadruple diversity configuration with for each diversity a forward TDL filter with three taps at a tap spacing of T/2. The backward TDL filter employed five taps at spacing T. The highest data rate of 12.6 Mb/s was contained in a 99% bandwidth of 15 Mhz, i.e. 0.84 bits/sec/Hz. The modem was tested with a channel simulator with values of $2\sigma_D/T$ that exceeded unity. The modem complexity in this application was dominated by the diversity order and the associated complexity of the forward TDL filter for each diversity. The use of the stochastic gradient algorithm also required continuous transmission so that this DFE could not be used in frame transmission systems with abrupt changes such as time-division multiplexed packet systems or frequency-hopping applications.

Block equalization strategies can be used in fading dispersive channels when the frequency spread $2\sigma_f$ is much less than the reciprocal block length such that the channel can be viewed as stationary during the block interval. A block DFE is described in *Channel Equalization for Block Transmission Systems*, G. K. Kaleh, IEEE Journal Selected Areas in Comm., pp. 110-121, January 1995, Known symbols are imbedded in the block in order to act as a time guard between successive blocks and to facilitate channel identification. The DFE is composed of a threshold detector, a feedforward transformation, and a feedback transformation. The DFE follows a symbol rate sampler and- a filter matched to -the combined transmit and unknown channel filter. The article does not include a channel identification technique. Another block DFE is described in *Block Channel Equalization in the Presence of a Cochannel Interferent Signal*, A. Ginesi, G. M. Vitetta, and D. D. Falconer, IEEE Journal Selected Areas in Comm., pp. 1853-1862, November 1999. In this solution an ideal anti-alias receive filter and a feedforward transformation with half-symbol tap spacing is used to reduce the effects of both ISI and cochannel interference. The feedforward transformation in the DFE is based on the suboptimum truncated infinite length DFE of Feedback Equalization and additionally the functions of matched filtering and ISI reduction are not separated to exploit transmitter fixed filter characteristics. In this and other block equalization techniques the equalizer complexity is a function of the block length and not the channel delay spread. In high data rate systems the block length is generally much greater than the delay spread thus producing an inherent block detection disadvantage.

In *MMSE Decision-Feedback Equalizers: Finite-Length Results*, N. Al-Dhahir and J. M. Cioffi, IEEE Trans. Information Theory, July, 1995 (hereafter, Finite Length DFE) the optimum finite length DFE under known channel conditions is constructed from a vector TDL filter. A forward vector TDL filter is determined by a Cholesky factorization of the matrix cross correlation of the received samples and transmitted symbols. In *Fast computation of channel-estimate based equalizers in packet data transmission*, N. Al-Dhahir and J. M. Cioffi, IEEE Trans. on Signal Processing, pp. 2462-2473, November 1995 (hereafter Fast Computation) an efficient algorithm is presented for computing the parameters of the finite length DFE assuming that the channel has been estimated using a known training pattern. Both these papers are for a single channel packet system and do not consider efficient implementation for multiple channels in diversity applications. A spectrum control filter in the transmitter and a corresponding noise-limiting filter in the receiver and their collective effect on channel estimation and equalization are also not considered in Finite Length DFE and Fast Computation.

Frequency and space diversity systems in, for example, troposcatter systems require separate redundant paths for each diversity reception. For example a quadruple space diversity system would use two transmit antennas transmitting on antenna ports with two orthogonal polarizations and two receive antennas with four radio frequency down-converters for each of the four antenna/polarization combinations. The polarization orthogonality does not in itself provide uncorrelated paths through the fading dispersive channel but quadruple diversity is still achieved as a result of the four separate paths between the transmit and receive antenna pairs. In this example the polarization orthogonality allows separation of these four paths at the receiver. A transmit diversity technique that separates transmissions from different antennas using a space-time block code (STBC) has been suggested in *A Simple Transmit Diversity Technique for Wireless Communications*, S. M. Alamouti, IEEE Journal Selected Areas in Comm., pp. 1451-1458, October 1998 (hereafter Transmit Diversity). However it was shown in *Performance Evaluation and Analysis of Space-Time Coding in Unequalized Multipath Fading Links*, Y. Gong and K. B. Letaief, IEEE Trans. Communications, pp. 1778-1782, November 2000 that an error floor occurs if nondispersive standard receivers are used when STBC signals are corrupted by ISI. In a direct approach, equalization to correct for the ISI degradation is separated from the STBC decoding. Examples of this direct approach include *Multiple Input/Multiple Output (MIMO) equalization for space-time block coding*, Proc. IEEE Pacific Rim Conf. Communications, Computers, Signal Processing, 1999, pp.341-344 and *Finite-length MIMO Decision-Feedback Equalization for Space-Time Block-coded Signals over Multipath Fading Channels*, N. Al-Dhahir, et.al., IEEE Trans. Vehicular Tech., pp. 1176-1182, July 2001. In this direct solution for the most relevant STBC application of a single receive antenna, the zero-forcing solution where all ISI is cancelled does not exist and the MMSE DFE has poor performance. An integrated equalization/STBC decoding technique using a widely linear (WL) processor is described in *Equalization Concepts for Alamouti's Space-Time Block Code*, W. H. Gerstacker, et. al., IEEE Trans. Communications, pp. 1178-1190, July 2004. The WL processor operates on both the received signal and its complex conjugate so the effects of complex conjugation in the STBC codebook can be considered. Adaptation of the processor and equalization with sampling greater than the symbol rate in order to meet the Nyquist criterion are not considered in this article. Another integrated equalization/STBC solution that includes a method of training-aided channel estimation is given in *Transmit Diversity and Linear and Decision-Feedback Equalizations for Frequency-Selective Fading Channels*, Ling Li, et. al., IEEE Trans. Vehicular Tech., pp. 1217-1231, September 2003. The DFE in this article uses a linear equalizer estimate at the end of a subframe to begin decision cancellation for earlier estimates in the subframe. Also the channel estimation and equalization in the Li article do not separate the transmit and channel filter effects and the article does not provide an equalization solution for required Nyquist sampling at greater than the symbol rate.

Although the techniques described above have been used for improving the quality of high data rate communication in fading dispersive channels, it has been recognized that MLSE technigues are more complex with little additional improvement relative to the DFE, block equalization techniques can be more complex in high data rate systems, and previous DFE techniques do not provide an optimal finite length solution under conditions of spectral emission limits, unknown channel variations, and diversity transmissions. Also systems operating in fading dispersive channels usually have performance significantly poorer than systems, such as satellite systems, that operate over nonfading channels. Additionally equalization is difficult in fading dispersive channel systems using transmit diversity transmissions with space-time block coding.

SUMMARY OF THE INVENTION

Figure 1:
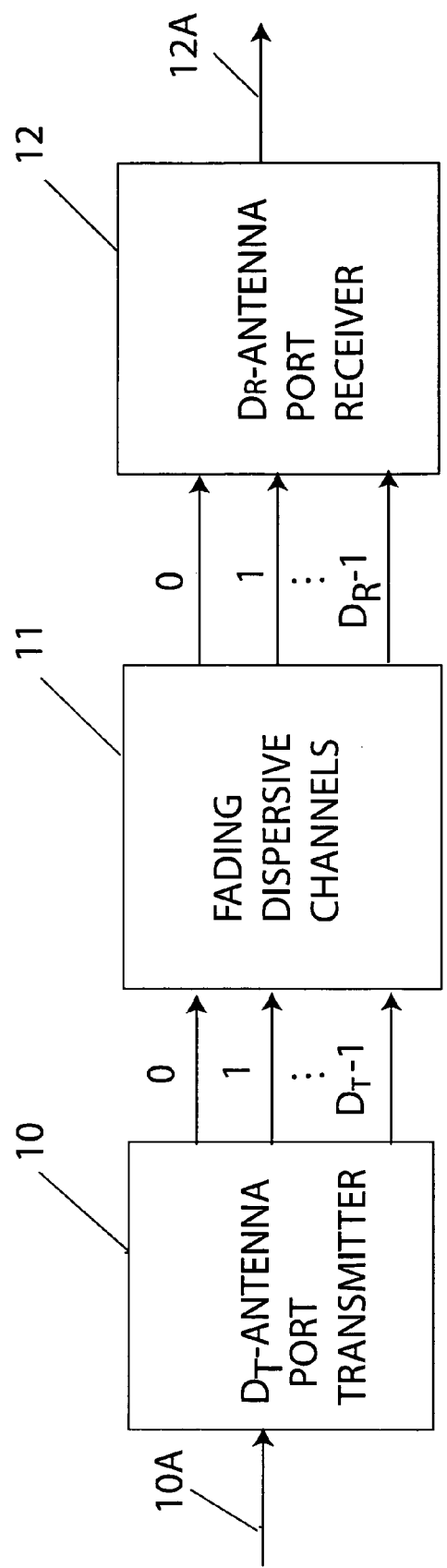
FIG. 1 is a block diagram of the multiple-antenna communication system.

With the foregoing background in mind, it is an object of the invention to provide, for high data rate communication operating over fading dispersive channels, a method and receiver with adaptive decision-feedback equalization of intersymbol interference and noise under conditions of spectral emission limitations, large multipath delay spread, and transmitter diversity with space-time block coding techniques.

Another object of the invention is to provide an equalization approach that uses reference data for channel estimation followed by direct calculation of equalizer parameters so as to provide improved adaptation to channel changes and enhanced quality of recovered user information relative to adaptive equalization techniques that attempt to directly estimate the equalizer parameters.

Still another object of the invention is to provide an optimum adaptive finite length decision-feedback equalization technique that has complexity that is a function of the channel delay spread and that is superior to previous suboptimum finite length receivers. Also included in this object is to provide an adaptive channel estimation technique based on optimum principles.

Another object of the invention is to provide a technique for troposcatter communication with only a single antenna at each link terminal and to achieve enough diversity to approach satellite link performance.

The foregoing and other objects are achieved in a high data rate communication application that transmits digital data information over fading dispersive channels and uses a Decision-Feedback Equalizer (DFE) at the receiver for recovering the transmitted digital data information. Typical applications include tropospheric scatter (troposcatter) systems, cellular systems such as high data rate applications in the cellular standard GSM, and digital data transmission over HF radio. In the present invention the DFE is adapted to the fading dispersive channel by (1) estimating channel parameters within a receiver time block where these parameters are approximately constant and (2) computing optimum DFE parameters for received signal processing within the receiver time block. This technique coupled with error-correction coding and interleaving over multiple receiver time blocks provides a robust adaptation to a wide range of changing channel conditions. The DFE parameters are computed using a Minimum Mean-Square Error (MMSE) criterion under the assumption that the estimated channel parameters are correct. The MMSE criterion is applied to a DFE structure that is optimum for a finite realization. The optimum finite length DFE of the present invention is superior to the suboptimum finite length DFE that is obtained by truncating the infinite length optimum DFE solution. The channel estimation is accomplished using transmitted time-division multiplexed reference sequences that are known at the receiver. At high data rates the channel dispersion can be severe with the result that the channel estimation/DFE parameter calculation of the present invention is significantly superior to conventional adaptive equalization using Least-Mean-Square or Kalman algorithms. Moreover, the number of reference symbols in the reference sequence does not need to be as large in the present invention compared to conventional adaptive equalization. In this high data rate application, the modest requirements on reference sequence length and robust adaptation insures that the reference overhead in the invention can be small.

The present invention also includes a space-time block code (STBC) in conjunction with multiple transmit antenna ports to provide additional diversity protection against fading. The dispersive nature of the channel seriously degrades STBC decoding but the use of the DFE in the present invention provides a combined equalization and decoding solution. In an STBC application each transmit antenna port emits a unique block of coded symbols within the same frequency band. The STBC structure allows for decoding of the interfering signals in the receiver. This structure is analogous to multiuser forward links in Code Division Multiple Access (CDMA) cellular systems. In CDMA systems the different code sequences allow for separation of interfering user transmissions. In the copending U.S. patent application Ser. No. 11/082,621, *Technique for Adaptive Multiuser Equalization in Code Division Multiple Access Systems*, filed 16 Mar. 2005, hereafter Multiuser Equalization, incorporated herein by reference, a DFE is described for equalization of K simultaneous transmissions to produce K user outputs. The DFE of the present invention includes and integrated STBC decoder and equalizer to estimate K information symbols associated with a single user. Because K symbols at a time are estimated the DFE complexity is determined by the channel delay spread and not the receiver time block length.

In the transmitter of the communication system the digital data information is error-corrected coded and interleaved before modulation. The modulation results in information symbols that are subsequently space-time block coded to produce $K_T \geq 1$ code blocks of L coded symbols for an input block of $K \leq K_T$ information symbols. The $K_T$ blocks of coded symbols are applied to $K_T$ transmit antenna ports to provide a transmit diversity potential. The invention includes an application without space-time coding which is included in general by the trivial STBC configuration where K=1,L=1 and the coded symbol is equal to the information symbol. In general the number of transmit antenna ports $D_T$ may exceed the number of STBC transmit diversities $K_T$ so repetitive transmit diversity is achieved with redundant (same signal) transmissions on the $D_T$-$K_T$ antenna ports. The coded symbols are time division multiplexed with reference symbols that are known to the receiver for the purposes of channel estimation. The high data rate allows for a data frame containing coded and reference symbols to be appreciably short so that the channel does not significantly change over the frame duration and the overhead due to the reference transmission can be small. The data symbols after time-division multiplexing are then filtered to meet spectral emission constraints. The spectrum control filter is characterized by its impulse response. In a typical radio application, the spectrum control filter is realized digitally with a finite impulse response FIR filter.

The high data rate and the frequency-selective dispersion of the fading channel result in intersymbol interference (ISI) that must be taken into account at the receiver. Additionally, fading produces weak signals that are compensated for with diversity techniques that include multiple transmitter and receiver antenna ports. ISI reduction and diversity combining is accomplished at the receiver with the channel-estimation decision-feedback equalizer (CE-DFE) of the present invention.

At the receiver there are $D_R$ receive antenna ports and the potential for D orders of receiver diversity where $D \geq D_R$. In a conventional dual-space/dual frequency (2S/2F), for example, there are $D_T$=2 antennas at the transmitter each transmitting from their respective antennas one of two frequency bands containing redundant signals. In this 2S/2F configuration at the receiver there are $D_R$=2 antennas and D=4 diversity signals corresponding to the four antenna-frequency bands combinations, i.e. $D_{T1}f_1$ to $D_{R1}$, $D_{T1}f_1$ to $D_{R2}$, $D_{T2}f2$ to $D_{R1}$, and $D_{T2}f_2$ to $D_{R2}$. Another important diversity configuration in troposcatter systems is angle diversity where multiple feedhorns and an antenna are used to provide multiple antenna ports associated with angularly spaced antenna beams. For example, in a conventional dual space/dual angle (2S/2A) configuration one power amplifier provides signals to horizontally polarized feedhorn 1 ($hf_1$) on antenna 1 ($D_{T1}$) and a second power amplifier provides the same signals to vertically polarized feedhorn 1 ($vf_1$) of antenna 2 ($D_{T2}$). Feedhorn 1 in this example produces the lowest transmit antenna beam. Feedhorn 2($f_2$) is not used for transmitting but is used to receive signals from an elevated antenna beam. At the receiver with a symmetrical antenna configuration there are $D_R$=4 antenna beam combinations providing D=4 diversity signals corresponding to the four spatial path combinations, i.e. $D_{T1}hf_1$ to $D_{R2}hf_1$, $D_{T1}hf_1$ to $D_{R1}hf_2$, $D_{T2}vf_1$ to $D_{R1}vf_1$ and $D_{T2}vf_1$ to $D_{R2}vf_2$. Test results that show the advantages of this 2S/2A diversity system over more commonly used 2S/2F systems are given in *Results of an Angle Diversity Field Test Experiment*, G. Krause and P. Monsen, National Telecomm. Record, pp. 17.2.1-17.2.6, 1978. In contrast with these repetition diversity configurations that use frequency bands or polarization to separate diversity signals, orthogonal codes are used in STBC applications to achieve diversity separation. In a symmetrical STBC example with $D_T$=$D_R$=2 antennas there are K=2 information symbols per code block and $K_T$=2 code blocks corresponding to the $D_T$=2 transmit antennas and at the receiver there are D=2 diversity signals corresponding to the $D_R$=2 receive antennas. In this STBC example the DFE of the present invention accomplishes the space-time block decoding in order to realize fourth order diversity. Generally the number of received diversity signals D is equal to $D_T D_R$ for L=1(no STBC) and equal to $D_R$ for $D_T$=$K_T$ for L>1.

The D diversity receive signals in the DFE of this invention are time sampled at an integer multiple, greater than one, of the data symbol rate in order to meet the Nyquist sampling theorem requirements. The received signal samples are then digitized and grouped into receiver vectors within receiver time blocks associated with the transmission of a data frame of transmitted data symbols. The data frame and associated receiver time block has a duration that is no greater than one-half of the interleaving delay so that block-to-block demodulation differences in the DFE processing will be compensated by subsequent decoding and deinterleaving.

The receiver time block is also selected to be sufficiently short so that the dispersive channel is approximately constant over its duration. Channel parameters consisting of the sampled impulse response for each of the $K_T$ STBC transmit diversities and D receiver diversities are computed in a channel estimator for the receiver time block. In the channel estimator the received vectors for each of the $K_T$ D combinations are correlated with one of the $K_T$ associated reference signals containing the reference symbol sequences. This correlation results in a coarse channel estimate. The reference signals are processed to form a correction matrix that takes into account sidelobes within and between the reference symbol sequences. In the preferred embodiment there are D of these correction matrices. The channel estimator then multiplies the coarse channel estimate for the dth diversity, d=0,1, . . . , D−1 by the dth correction matrix to obtain $K_T$ D channel impulse responses. The CE-DFE uses these estimated impulse responses to determine the DFE parameters for processing the D receive signals.

The DFE processes the received vectors to produce successive estimates of transmitted information symbols. These estimates are subsequently deinterleaved and decoded to reconstruct the transmitted digital data information. The DFE includes a feed-forward filter comprising a matched filter and a forward filter, a backward filter, and a detector. The matched filter combines components resulting in a signal-to-noise ratio enhancement. The matched filter, however, also increases the intersymbol interference. The ISI is subsequently processed in the ISI subsystems comprising the forward filter, backward filter, and detector. The ISI is partitioned into symbol interference due to symbols not yet detected in the detector, i.e. future ISI, and symbols that have been detected in the detector, i.e. past ISI. The forward filter minimizes the future ISI and the backward filter generates a past interference signal for past ISI cancellation. The detector in the DFE passes the information symbol estimates to the deinterleaver and decoder. The information estimates are produced by the DFE in successive groups of K symbols at a time as opposed to certain block equalization strategies that produce an entire block of estimates at one time. Consequently the DFE has complexity related to the channel duration as opposed to the much longer block length.

The matched filter includes three operations that are accomplished in a fixed filter correlator, a symbol combiner, and a channel matched filter. The fixed filter correlator correlates the receive vectors with the spectrum control impulse response to reduce the effects of out-of-band noise and to emphasize the desired signal components. The resulting fixed filter correlated signals are then aligned and combined in the symbol combiner. K information symbol estimates are associated with an estimation interval that has duration of L symbols where L is the STBC length and K is the number of information symbols in the code block. For this estimation interval the symbol combiner produces fixed matched filter signals that depend on consecutive P+1 symbol epochs starting with the first symbol epoch in the code block containing the coded symbols associated with the information symbol to be estimated. The role of the symbol combiner is to combine signal values after fixed filter correlation that are associated with a particular one of the P+1 symbol epochs. Subsequently in the channel matched filter, the P+1 fixed filter matched signals are combined with the channel parameters to provide P+1 coded matched signals. These signal processing operations use a vector arithmetic that is not equivalent to TDL filter functions used in conventional equalization so the resulting coded matched signals are nonstationary, i.e. components of the P+1 coded matched signal vector do not have second order statistics that depend only on their index difference. In the absence of a STBC these coded matched signals are the channel matched signals at the output of the matched filter. With a STBC the channel matched filter further decodes the coded matched signals to provide P+1 channel matched signals at the matched filter output. The channel matched signals are mathematically equivalent to Maximum-Likelihood (ML) estimates of transmitted data symbols. In an alternative embodiment the diversity combining of the channel matched signals is postponed until after forward filter dot products are computed for each diversity.

The forward filter is realized as K vector filters of length P+1 each of which multiplies P+1 channel-matched signals by P+1 vector weights to form a dot product. The K dot products are combined with past interference signals generated in the backward filter to produce K information symbol estimates for the L-symbol estimation interval. The detector passes the K information symbol estimates on to the deinterleaver/decoder for reconstruction of the transmitted digital data information. The detector also selects from the possibly transmitted set of information symbols an information symbol decision that is closest in signal distance to the information symbol estimate. For example with Quadrature-Phase-Shift-Keying (QPSK) symbols the selection process is equivalent to quantizing the real and imaginary parts of the estimate to its sign value.

The information symbol decisions are used in a backward filter to produce the past interference signals for cancellation of ISI associated with previously estimated symbols. The information symbol decisions are arranged in a decision vector of length P. For the L-symbol estimation interval the backward filter forms K dot products corresponding to K backward filter vectors and the decision vector to produce K past interference signals. These signals are combined with the K future ISI dot products in the forward filter to produce K information symbol estimates. In an alternative embodiment past interference signals are produced in the backward filter and past ISI cancellation is accomplished in the matched filter prior to future ISI equalization.

A technique is also described for employing a single antenna at each end of a troposcatter link but in a configuration so as to realize almost the same performance as in a nonfading satellite system. To achieve such performance an angle diversity system is used to provide a basis for asymptotic quadruple diversity performance and this basis is then augmented with additional diversity through bandwidth expansion. Bandwidth extension methods include (1) frequency hopping and (2) employing a fixed or pseudo-random Direct Sequence (DS) pattern.

DETAILED DESCRIPTION OF THE INVENTION

A method of receiving and a receiver including a channel-estimating decision-feedback equalizer (CE-DFE) are described for use in communication links where high data rates with spectral limits are used to transmit digital data information over fading dispersive channels. An example communication link is shown in FIG. 1 where digital data information 10A is applied to a $D_T$ antenna-port transmitter 10. The transmitter 10 includes error correcting coding and interleaving of the digital data information. Interleaved and error-corrected coded data is modulated to provide information symbols. In a Space-Time Block Code (STBC) embodiment the information symbols are coded using a STBC codebook to produce coded symbols. In the trivial STBC embodiment there is no STBC and the coded symbols are equal to the information symbols. The coded symbols are then time division multiplexed with reference symbols to provide data symbols with data rate 1/T. The data symbols are filtered, RF converted and amplified in transmitter 10 and sent from $D_T$ antenna ports over fading dispersive channels.

In this high data rate fading channel application the data symbol rate 1/T is much greater than the twice-standard deviation $2\sigma_t$ in Hertz of the time-selective dispersion so that adaptation can be accomplished by estimating the channel realizations from fading dispersive channels 11 in a receiver time block containing N coded symbols and J reference symbols where $(N+J)T<<1/\sigma_t$. The potential for multipath diversity and the effects of intersymbol interference (ISI) result from the frequency dispersive aspects of channel 11. The frequency dispersive effects can be expressed as twice the standard deviation $\sigma_f$ in seconds of the frequency-selective dispersion. For high data rates rates where $2\sigma_f$ is on the order of or larger than T, adaptive equalization can combine the multipath diversity components and minimize the multipath induced ISI. The reduction of multipath ISI is not without a penalty that reduces the effectiveness of the multipath diversity combining. It is desirable to perform the equalization so as to keep the ISI penalty as small as possible.

Processing of received signals is accomplished in $D_R$ antenna-port CE-DFE receiver 12 in order to produce recovered digital data information 12A corresponding to the transmitted digital data information 10A.

Figure 2:
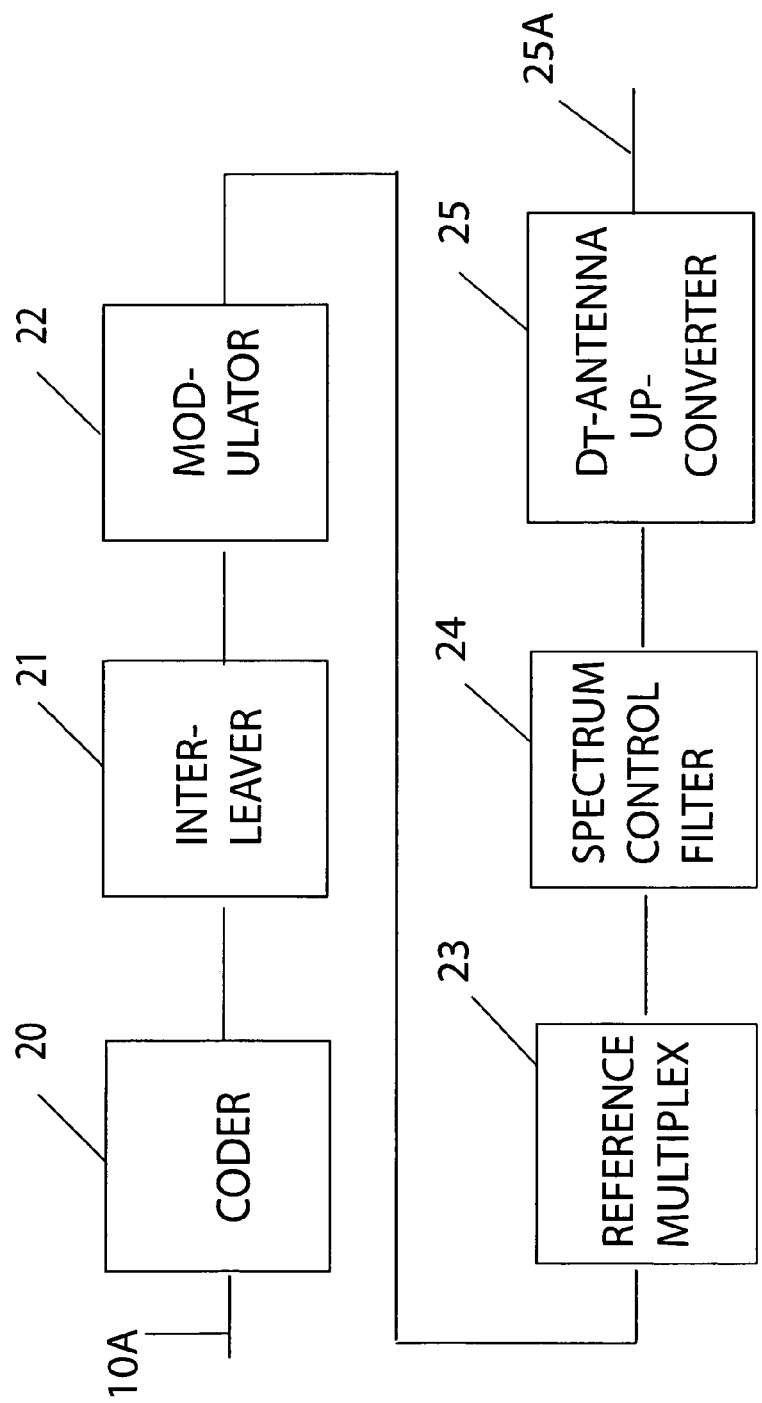
FIG. 2 is a block diagram of the $D_T$-antenna transmitter of FIG. 1.

In transmitter 10 in FIG. 2 digital data information is applied to error-correction coder 20. For example, error-correction coder 20 may be a block, turbo, or convolutional coder such as the rate ½, constraint length 7, binary convolutional code with generator 133, 171. The error-correction coded data at the error-correction coder 20 output is then interleaved over multiple receiver time blocks by interleaver 21. Either a convolutional or a block interleaver, both of which are described in *Error-Correction Coding for Digital Communications*, G. C. Clark, Jr. and J. Bibb Cain, Plenium Press, New York, N.Y., June, 1981, may be used. The interleaving delay length is at least the length of two receiver time blocks so as to provide protection against variations in equalization performance in successive blocks.

The output of interleaver 21 is converted in modulator 22 to a sequence of modulation symbols. For example, with M-ary Phase-Shift-Keying (MPSK), the modulation symbols are complex and can be represented by the set exp(j2πm/M+ jπ$\Delta_M$/4), m=0,1, . . . M−1, $\Delta_M$=1, M=4, $\Delta_M$=0, otherwise. MPSK also includes Offset Quadrature Phase-Shift Keying (OQPSK) where M=4 but the in-phase and quadrature fixed filter pulses are offset by one-half symbol. With MPSK signaling and a binary error-correction code, for example, $\log_2$ (M) bits at a time from error-correction coder 20 can be interleaved in interleaver 21 and then for each $\log_2$ (M) output bits, modulator 22 would produce one MPSK information symbol. In the present invention modulator 22 may also contain space-time block coding that further modifies the MPSK information symbols. A space-time block coder operates on the information symbols containing error-corrected bits to produces coded symbols according to the STBC codebook. The output of modulator 22 consists of coded symbols that are subsequently multiplexed with reference symbols in reference multiplexer 23 to produce data symbols at the data symbol rate of 1/T. In the absence of a STBC the coded symbols are equal to the information symbols containing the error-corrected bits. The transmitter 10 also includes a spectrum control filter 24 for limiting the spectral emissions after radio frequency (RF) conversion and transmission in $D_T$-antenna up-converter 25. Up-converter 25 contains one or more RF conversion paths depending on the number of different transmitted signals. After RF conversion up-converter 25 usually further includes a separate power amplifier for each of the $D_T$ antenna ports. In certain applications up-converter 25 converts the filtered signals at the output of spectrum control filter to an intermediate frequency (IF) such as 70 Mhz to provide a modem interface. Subsequent RF conversion and power amplification is then accomplished in radio equipment after the modem interface.

In conventional diversity systems the same data symbols are sent from each of the $D_T$ transmitter antenna ports. The $D_T$ transmitter antenna ports can only increase the total diversity order if some method is employed at the antennas to discriminate between the redundant paths. Conventional techniques, for example in troposcatter systems, use frequency bands or polarization for this discrimination. Space-time block codes such as described in Transmit Diversity provide transmit antenna discrimination by using codes that are orthogonal in space, i.e. antennas, and time, i.e. modulation symbols. Accordingly for transmission of a space-time block code, modulator 22 provides a set of $K_T$ code blocks each comprising K information symbols and L coded symbols. By definition of a STBC the $K_T$ code blocks are mutually orthogonal. The coded symbols in one of the respective $K_T$ code blocks are time-division multiplexed with reference symbols in reference multiplexer 23, spectrum limited in spectrum control filter 24 and subsequently converted to bandpass signals in up-converter 25 for transmission on one of respective $K_T$ of the $D_T$ transmitting antenna ports. In most STBC applications $D_T$=$K_T$ but $D_T$ can be greater than $K_T$ with coded symbols repeated on the extra antenna ports. In the preferred embodiment of the present invention $K_T$=$D_T$. The STBC transmits K information symbols in a code block duration of L coded symbols for a code rate equal to K/L. As an example, the Alamouti code in Transmit Diversity has K=$K_T$=L=2 and $D_R$≧1, and achieves system diversity equal to $K_T D_R$ for a unity code rate. In this Alamouti STBC example, modulator 22 produces the two symbol code block $S_0$, −$S_1$* for transmission on transmit antenna k=0 and the two symbol code block $S_1$,$S_0$* for transmission on k=1 transmit antenna. Note the two STBC blocks are orthogonal as required. In the preferred embodiment of this invention these symbols in the STBC blocks are MPSK symbols.

In this band-limited application, the required spectral occupancy is accomplished at the transmitter 10 with spectrum control filter 24 with impulse response f(t). The function f(t) is selected to limit the bandwidth and to produce minimal or no ISI when received signals are combined in a matched filter receiver with a filter with impulse response f(−t). For a communication link with data symbols with period T, the autocorrelation function $$\phi(t) = \int_{-\infty}^{\infty} f(t)f(t+T)dt$$

must satisfy $$\phi(kT)=0 \; k \neq 0$$

for the condition of no ISI due to fixed transmitter and received filters. In many applications, spectral limiting and zero ISI is accomplished with the square root raised cosine (SRRC) pulse with rolloff factor r where 0<r≦1. The Fourier transform F(f) for the SRRC pulse is symmetrical about f=0 and is defined as $$F(f) = \begin{cases} 1 & 0 \leq f < \frac{1-r}{2T} \\ \left(\frac{1}{2}+\frac{1}{2}\cos\frac{\pi T}{r}\left(f-\frac{1-r}{2T}\right)\right)^{\frac{1}{2}} & \frac{1-r}{2T} \leq f \leq \frac{1+r}{2T} \end{cases}$$

In practice the impulse responses f(t) at transmitter 10 can be realized with either analog filters or digitally using, for example, a shift register at the initial receiver sampling rate with fixed tap register weights in a finite impulse response (FIR) filter. The duration of the fixed filter impulse response is defined as spanning I symbols.

In fading dispersive channels such as in troposcatter communications, the profile of distributed multipath energy is continuous. The combining of these multipath returns requires a sampling rate for complex baseband signals at least as large as the Nyquist bandwidth which for the SRRC example is (1+r)/T, 0<r≦1. A sampling rate of Q/T satisfies the Nyquist criterion for arbitrary rolloff factor if Q is integer and Q≧2. Symbol rate equalization when Q=1 cannot collect all the sufficient statistics and is always suboptimum because practical filters require r>0.

The twice standard deviation width 2$\sigma_f$ of the multipath energy profile is a measure of the frequency-selective dispersion. When the multipath energy profile is continuous, the number of significant paths produced by the multipath is about $$M = \frac{4\sigma_f}{T/Q} = \frac{4Q\sigma_f}{T}$$

The largest delay multipath component has delay (M−1)T/Q seconds so the channel span is C symbols where $$C = \left[\frac{M+Q-2}{Q}\right],$$

and [ ] is the lower integer, $I_L(x)=[x] \leq x$. C represents the number of symbols that produce intersymbol interference due to channel multipath. Even though the fixed filter contributes no ISI at symbol shifts of T seconds, the combination of multipath delays at fractional symbol spacing qT/Q, q=1, 2 . . . , Q−1, and the fixed filter impulse response produces combined ISI that must be treated in the equalizer. In this combined ISI there are contributions from the symbol to be estimated over a combined channel span of (I+C)T seconds and the number of combined intersymbol interferers is I+C−1.

Figure 3:
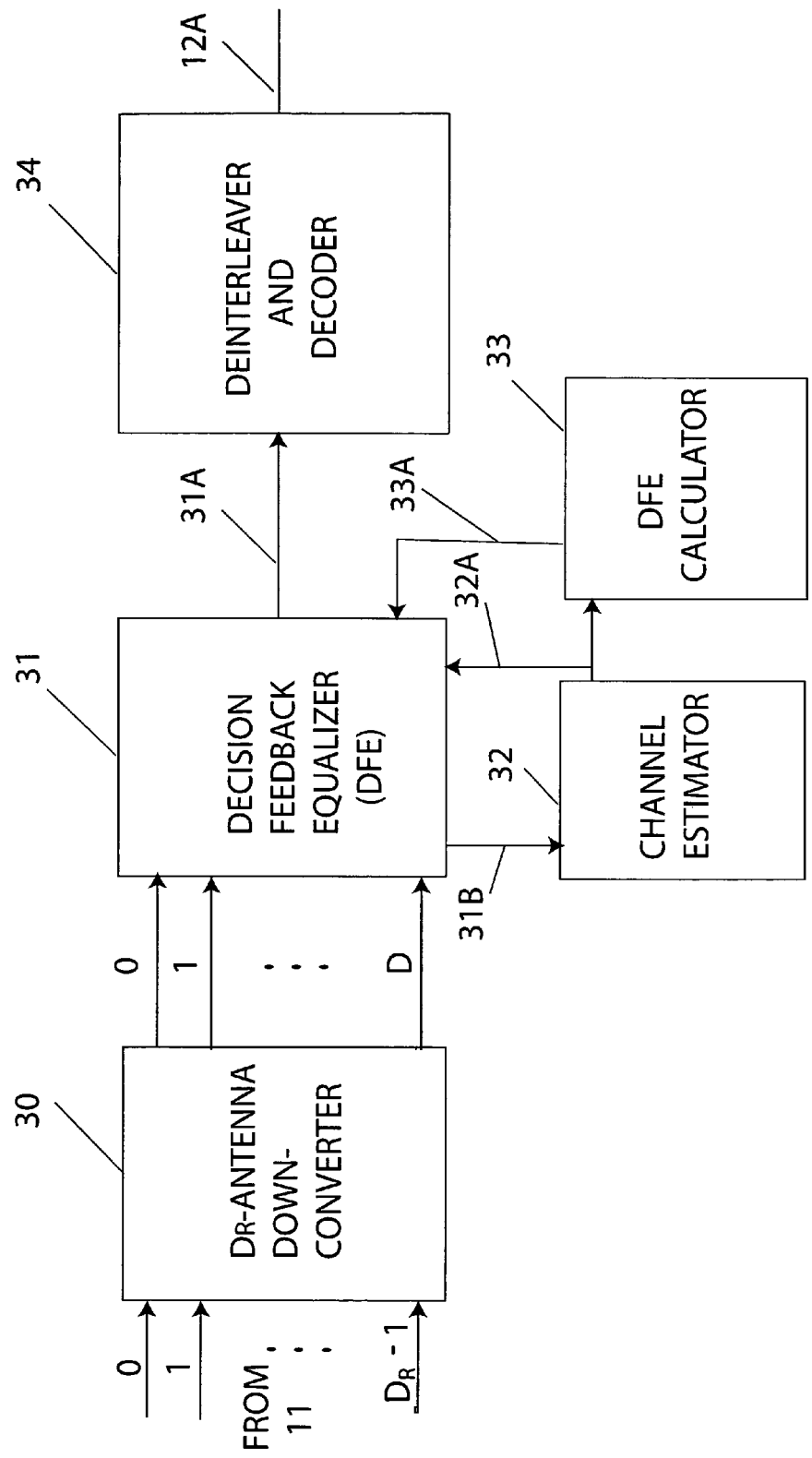
FIG. 3 is a block diagram of the $D_R$-antenna receiver of FIG. 1.

FIG. 3 illustrates the subsystems used in CE-DFE receiver 12 for processing $D_R$ received antenna port signals. Conventionally diversity channels are separated by antennas, i.e. space diversity, by frequency band, i.e. frequency diversity, by antenna ports with offset beam angles, i.e., angle diversity, and by antenna/polarization marking, i.e., quadruple space diversity. Down-converter 30 converts the $D_R$ antenna signals to a set of D diversity signals corresponding to the number of redundant and separable paths in the diversity configuration. For example, in troposcatter systems, a duel-space/dual frequency (2S/2F) configuration is often used to provide quadruple system diversity. In the 2S/2F configuration, a power amplifier in frequency band $f_1$ transmits on one of the $D_T=2$ antennas and a power amplifier for frequency band $f_2$ transmits on the other transmit antenna. At receiver 12 each of the $D_R=2$ antenna signals are separated into the two frequency bands to produce D=4 received diversity signals at the output of down-converter 30. The number of redundant and separable paths D is then the number of diversity channels provided by down-converter 30. Diversity channels resulting from multiple receive antennas can be augmented by using space-time block coding on $K_T=D_T$ transmitting antenna ports. A major advantage in the application of a STBC to troposcatter systems is that the number D of processed diversity signals produced by down-converter 30 is only $D_R$ instead of $K_T D_R$ because the $K_T$ transmit diversity channels are separated in DFE 31.

The D received diversity signals may be at an intermediate frequency or baseband and may be either analog or digital. In the preferred embodiment the D received signals are in complex baseband format with in-phase and quadrature components and are time sampled and digitized at an integer multiple of the data symbol rate in order to meet the Nyquist sampling theorem requirements. The received signal samples are grouped as received signal vectors within receiver time blocks associated with the transmission of a data frame of transmitted data symbols. The received vectors are subsequently processed by the DFE 31. After fixed filter matching operations in DFE 31 D fixed filter matched signals are provided on 31B to channel estimator 32. The channel estimator 32 generates channel coefficients 32A that are subsequently used by DFE 31 and DFE calculator 33. The DFE calculator 33 computes the DFE parameters that are provided on 33A to DFE 31. Within a receiver time block the DFE generates K information symbol estimates 31A at a time corresponding to K-symbol groups of transmitter information symbols. In producing the K information symbol estimates DFE 31 includes received signal components over a DFE span equal to a time window of (P+1)T seconds. The DFE processing includes matched filtering and future ISI processing using a set of P+1 adaptive complex coefficients for modifying the received signals. The information symbol estimates 31A are processed in the deinterleaver and decoder 34 to produce the recovered digital data information 12A.

The error-correction coding in the present invention serves to improve average bit error rate performance when there is sufficient diversity. In combination with interleaving over multiple receiver time blocks, the error-correction also decreases sensitivity to imperfect channel estimation in successive blocks. In applications where latency of the data is not a critical requirement, time diversity can be achieved by interleaving over intervals on the order or greater than the reciprocal of the time-dispersive standard deviation $\sigma_r$.

For convenience the constants used in the above description are summarized here:
C=channel span in data symbols
$D_T$=number of transmit antenna ports
$D_R$=number of receive antenna ports
D=number of receiver diversity channels
I=fixed filter duration in data symbols
J=number of reference symbols in data frame
$K_T$=number of STBC blocks transmitted simultaneously
L=number of coded symbols in a STBC block
M=number of multipath returns
N=number of coded symbols in data frame
P+1=DFE span in data symbols
Q=number of received signal samples per data symbol
T=reciprocal data symbol rate In the absence of a STBC when L=1 the information and coded symbol sequence are equal and this sequence is transmitted from each of the $D_T$ transmitting antenna ports using a discrimination means such as frequency band or polarization marking. For the general STBC example with $L \geq K_T \geq K \geq 1$, including the trivial STBC L=1 case above, a coded symbol sequence $c_n^{(k)}$, n=0,1, . . . L−1 is transmitted on the kth transmit antenna port, k=0,1, . . . $K_T$−1. The received signal for diversity d, $0 \leq d \leq D-1$, $D \geq D_R$, can than be written in terms of DM$K_T$ channel coefficients $h_m^{(d,k)}$, M=0,1, . . . ,M−1, k=0, 1 . . . $K_T$−1 within a receiver time block. It is assumed that the channel coefficients do not change during the block time. The block contains both the reference and coded symbols. The received signal associated with N successive coded symbols starting at the index n=0 is then $$r^{(d)}(t) = \sum_{k=0}^{K_T-1} \sum_{n=0}^{N-1} c_n^{(k)} \sum_{m=0}^{M-1} h_m^{(d,k)} f(t - mT/Q - nT) + u^{(d)}(t)$$

where $u^{(d)}(t)$ represents additive white Guassian noise.

Figure 4:
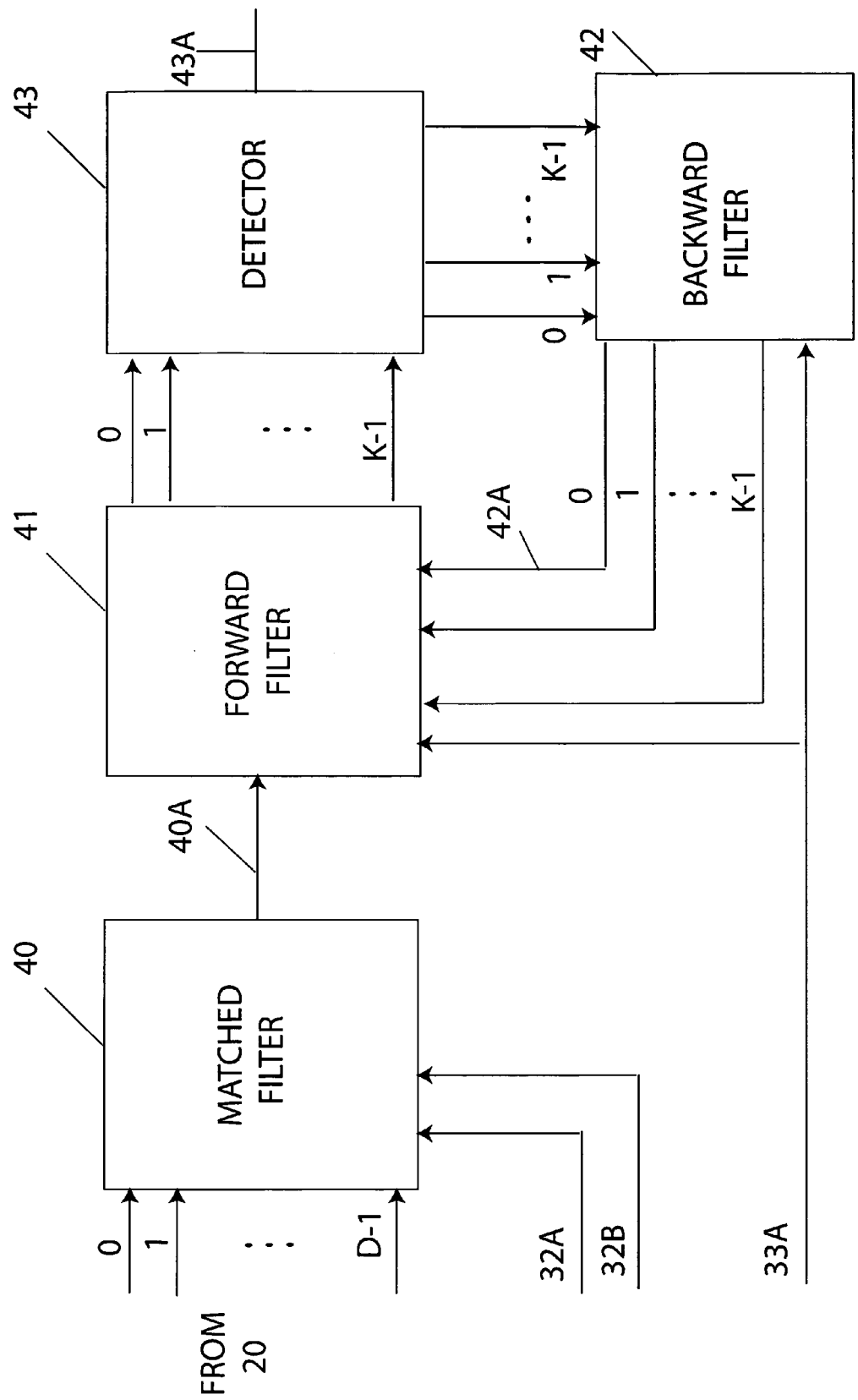
FIG. 4 is a block diagram of the Decision-Feedback Equalizer (DFE) of FIG. 3.

The DFE 31 processes the D received diversity signals to produce KN/L information symbol estimates 31A of the unknown information symbols within a data frame. It is assumed that time synchronization has already occurred and coded symbol epochs n=0,1, . . . ,N−1 at the receiver associated with the earliest multipath return of respective code symbols have been identified. For the K/L STBC the information symbol estimates are then generated during successive estimation intervals of length L symbols in duration beginning at coded symbol epochs that satisfy n mod L=0. For each estimation interval K information symbol estimates are produced by DFE 31. Using knowledge of the J reference symbols in the block, channel estimator 32 generates the M $K_T$D channel coefficients that are provided on 32A to DFE 31. These M $K_T$D channel coefficients are also used in DFE calculator 33 for computation of the equalizer parameters that are provided on 33A to DFE 31. DFE 31 is shown in FIG. 4 to include a feed-forward filter comprising matched filter 40 and forward filter 41, a backward filter 42, and symbol detector 43. In this invention the filters are realized as vector operators rather than tapped-delay-line filters with stationary inputs in the optimum infinite length and suboptimum finite length solutions in Feedback Equalization. Consequently the signal outputs from matched filter 40 are nonstationary, i.e. signal components do not have second order statistics that depend only on their index difference. The role of matched filter 40 is to combine signal components resulting in a signal-to-noise ratio enhancement. Matched filter 40, however, also increases the intersymbol interference. The ISI is subsequently processed in forward filter 41 and backward filter 42 of DFE 31. The ISI is partitioned into symbol interference due to symbols not yet detected in detector 43, i.e. future ISI, and symbols that have been detected in detector 43, i.e. past ISI. The forward filter 41 minimizes the future ISI and the backward filter 42 generates a past interference signal for past ISI cancellation in forward filter 42. In an alternative embodiment past ISI is cancelled in matched filter 40.

Matched Filter

The matched filter 40 limits input additive noise and combines multipath and channel diversity components associated with the symbols used in forward filter 41 for ISI reduction. For purposes of describing the matched filter structure it is convenient to ignore end-of-block edge effects and to separate out the terms in the received signal that will be subsequently cancelled by backward filter 42 signals. Near the end of the receiver time block with a time guard between blocks the DFE equations are the same but the number of future interferers is reduced at the block end. This edge effect can be either ignored with a resulting small degradation, or if processing time is adequate, the equalizer parameters can be updated for end-of-block conditions using the equations herein for a reduced number of future interferers. For continuous transmission without time guards between blocks a new set of DFE parameters are calculated for each block but there are no edge effects as received signals associated with the next block can be used for end of block processing.

For estimation of information symbols $a_{n+k}$, $k=0,1,\ldots K-1$ in the nth estimation interval, n mod $L=0$, for $n=0,1\ldots,N-1$, it is necessary to determine a minimum DFE length that includes all the relevant received statistics. For the finite length DFE with $P+1$ complex weights in forward filter 41, the DFE span length is defined as $P+1$ symbols and a maximum of P complex ISI terms can be accommodated. The combined symbol span of the fixed filter and multipath components has been defined as $(I+C)T$ with $I+C-1$ ISI terms. Thus for the trivial STBC with $L=1$ the minimum P is equal to $I+C-1$. For the general STBC application the DFE in the present invention determines the information symbol estimates $ã_{n+k}$, $k=0,1,\ldots K-1$ for the nth symbol estimation interval, n mod $L=0$. The minimum P represents the number of ISI terms affecting the last coded symbol in the L-length block code. Thus for a STBC one has $P=I+C+L-2$ relevant ISI terms but because L-subblock DFE processing is used the minimum span $P_{min}+1$ for forward filter 41 is the smallest integer multiple of L that satisfies $$P_{min}+1 \geq I+C+L-1 \tag{1}$$

In general for arbitrary value of P in forward filter 41 there are P interferers and $P+1$ weights so all the future ISI can be perfectly cancelled in the zero noise limit. In contrast the suboptimum finite length solution in Feedback Equalization uses a forward TDL filter with stationary input statistics that continually adds a new future ISI interferer for each additional symbol dimension so the future ISI can only be perfectly cancelled in the infinite length limit. When the minimum length constraint in Eq. (1) is satisfied in the present invention the minimum sufficient statistics on the STBC block are utilized and the DFE minimizes the sum of the ISI power and additive noise power. The minimization of ISI results in smaller noise enhancement as P is increased beyond $P_{min}$. In dispersive fading with multiple diversity channels the matched filter combining effect is typically more important than the ISI penalty so that operation with the minimum length condition $P=P_{min}$ is a practical choice.

For the $n^{th}$ estimation interval where the coded symbol epoch n in the receiver time block satisfies n mod $L=0$ the received diversity signal can then be written over the DFE span of duration $0 \leq t \leq (P+1)T$ seconds. This span contains $P+1$ unknown coded symbols and a past interference signal $v^{(d)}(t+nT)$ that contains previous symbols that will be subsequently cancelled with the backward filter 42 past interference signal.

$$r^{(d)}(t+nT) = \sum_{k=0}^{K_T-1} \sum_{i=n}^{P+n} c_i^{(k)} \sum_{m=0}^{M-1} h_m^{(d,k)} f(t+nT-mT/Q-iT) + \tag{2}$$

$$v^{(d)}(t+nT) + u^{(d)}(t+nT)$$

For general bandpass channels in radio applications all terms in Eq.(2) are complex with the possible exception of the fixed filter impulse response f(t) which is typically real. A vector and matrix representation is used in the sequel to describe the channel, STBC functions and the DFE operations. For nonoffset MPSK and without a STBC, all vectors and matrices can be expressed in terms of complex scalar components and matrix operations follow complex arithmetic rules. The mathematical description is also more easily described with a complex-scalar representation. Offset QPSK or use of a STBC requires a real 2-vector representation for complex scalars. For vector operations 2-vector arithmetic is more general than complex-scalar arithmetic. For example if c and b are complex scalars one can in real 2-vector representation define c=Ab to mean c=b*, the complex conjugate. For these reasons, vectors and matrices are defined equivalently as either the complex-scalar or in the real 2-vector representation.

In the subsequent vector and matrix equations the following notation is used:

(1) the vector notation describes equivalently either a complex vector with $N>1$ complex entries or a real vector with 2N real entries where the imaginary component follows immediately after the real component; for example the equivalent $N=2$ complex vector and rank 4 real vector are Complex:

$$a = \begin{bmatrix} a_0^{(0)} + ja_0^{(1)} \\ a_1^{(0)} + ja_1^{(1)} \end{bmatrix}$$

-continued

Real:

$$\underline{a} = \begin{bmatrix} a_0^{(0)} \\ a_0^{(1)} \\ a_1^{(0)} \\ a_1^{(1)} \end{bmatrix}$$

(2) complex vectors or real vectors of order greater than two are indicated with an underbar, subscripts denote a time index, superscripts denote diversity or space indices, and a parenthesis argument if present indicates a variable vector dimension, (3) a matrix is capitalized, inside index represents the row and outside index represents the column, subscripts if present denote a variable matrix dimension, and arguments give a functional dependence, (4) The matrix notation describes equivalently either a M×N matrix with MN complex scalar entries or a 2M×2N matrix with 4MN real entries where, for example, if $A_{mn} = A_{mn}^{(0)} + jA_{mn}^{(1)}$ in the complex representation then for p,q,=0, 1, the real matrix coefficients $A_{2m+p,2n+q}$ are $p=0$: $A_{2m,2n+q} = \lambda_{0q} A_{mn}^{(q)}$ q=0,1

$p=1$: $A_{2m+1,2n+q} = \lambda_{1q} A_{mn}^{(\bar{q})}$ q=0,1, $\bar{q}=(q+1)mod2$ and $\lambda_{pq} = -1$ for $p=0, q=1$ and $\lambda_{pq} = 1$ otherwise As an example the rank 2 complex matrix is written as the rank 4 real matrix $$A = \begin{bmatrix} A_{00}^{(0)} & -A_{00}^{(1)} & A_{01}^{(0)} & -A_{01}^{(1)} \\ A_{00}^{(1)} & A_{00}^{(0)} & A_{01}^{(1)} & A_{01}^{(0)} \\ A_{10}^{(0)} & -A_{10}^{(1)} & A_{11}^{(0)} & -A_{11}^{(1)} \\ A_{10}^{(1)} & A_{10}^{(0)} & A_{11}^{(1)} & A_{11}^{(0)} \end{bmatrix}$$

(5) matrices that describe OQPSK or STBC operations are real and they can only operate with the real vector and matrix representations, (6) indices in vector and matrix definitions follow DO loop format with the outer index representing the outer DO loop, (7) $\underline{a}$ is a column vector and $\underline{a}'$ denotes the complex transpose in the complex representation and the transpose in the real representation, (8) where possible, vectors and matrices are defined using the complex representation.

It is also convenient to introduce a vector notation to represent the time variable t for subwindows of duration T within the DFE span. These vectors can be realized in analog form or as in the preferred embodiment as digital samples. For the received signal, past interference signal, and noise signal, respectively define the T-dimension column vectors associated with the dth diversity, d=0,1, . . . , D−1.

$$\underline{r}_n^{(d)} = \{r^{(d)}(t+nT), 0 \leq t < T\} \quad (3a)$$

$$\underline{v}_n^{(d)} = \{v^{(d)}(t+nT), 0 \leq t < T\} \quad (3b)$$

$$\underline{u}_n^{(d)} = \{u^{(d)}(t+nT), 0 \leq t < T\} \quad (3c)$$

where notationally the lower index is at the top of the column vector. The fixed filter impulse response f(t) in Eq. (2) can be represented by a set of P+1 vectors for each of the M multipath returns. Note f(t)=0 for t<0 and f(t)=0 for t≧IT. One defines the T×1 vector $$\underline{f}_{-m/Q+p} = \{f(t-mT/Q+pT), 0 \leq t < T\} \quad (4)$$

and the fixed filter T×M matrices $$F(p) = [\underline{f}_{-1/Q+p} \ldots \underline{f}_{-(M-1)/Q+p}] 0 \leq p \leq P \quad (5)$$

One notes that outside the range of Eq. (5) the matrices are zero matrices so that for p<0 and p>P, F(p)=0. Associated with the fixed filter matrix is a diversity channel coefficient M×1 vector $$\underline{h}^{(d,k)} = \{h_m^{(d,k)}, m=0,1, \ldots M-1\} \quad (6)$$

Because f(t) is causal, the T-duration received signal vector of Eq. (3a) in the 0th subwindow of the nth estimation interval, n mod L=0, is a function only of the coded symbols $c_n^{(k)}$, k=0,1, . . . $K_T$−1 and a past interference signal, viz., $$\underline{r}_n^{(d)} = F(0) \sum_{k=0}^{K_T-1} \underline{h}^{(d,k)} c_n^{(k)} + \underline{v}_n^{(d)} + \underline{u}_n^{(d)} \quad (7a)$$

Each additional time subwindow introduces in the received signal vector a dependence on an additional future ISI symbol. See Eq. (1) above for the minimum P criterion. In general the received signal vector in the pth subwindow is $$\underline{r}_{n+p}^{(d)} = \sum_{q=n}^{p+n} F(n+p-q) \sum_{k=0}^{K_T-1} \underline{h}^{(d,k)} c_q^{(k)} + \underline{v}_{n+p}^{(d)} + \underline{u}_{n+p}^{(d)} \quad (7b)$$

$$p = 0, 1, \ldots P$$

The first term in Eq.(7b) illustrates the effect of future ISI due to symbols $c_{n+p}^{(k)}$, k=0,1, . . . $K_T$−1 for p>0. The past ISI that is cancelled subsequently due to processing in backward filter 42 is also a function of the fixed filter matrices and channel vectors. The past interference signal is $$\underline{v}_{n+p}^{(d)} = \sum_{i=1}^{P-p} F(p+i) \sum_{k=0}^{K_T-1} \underline{h}^{(d,k)} c_{n-i}^{(k)} \quad p = 0, 1, \ldots P \quad (8)$$

and one notes that there is no past ISI in the received signal vector in the Pth subwindow. The received signal of Eq. (7b) can be written in terms of the unknown coded symbol vector $$\underline{c}_n = \{c_{n+p}^{(k)}, p=0,1, \ldots P, k=0,1, \ldots K_T-1\} \quad (9)$$

and compound vectors containing the P+1 subwindows $$\underline{r}_n^{(d)}(P) = \{\underline{r}_{n+p}^{(d)}, p=0,1, \ldots P\}$$

$$\underline{v}_n^{(d)}(P) = \{\underline{v}_{n+p}^{(d)}, p=0,1, \ldots P\}$$

$$\underline{u}_n^{(d)}(P) = \{\underline{u}_{n+p}^{(d)}, p=0,1, \ldots P\} \quad (10a)$$

as $$\underline{r}_n^{(d)}(P) = F_P H_{PK_T}^{(d)} \underline{c}_n + \underline{v}_n^{(d)}(P) + \underline{u}_n^{(d)}(P) \quad (10b)$$

The $(P+1)T\times(P+1)M$ compound fixed filter matrix $F_P$ can be written in DO loop format with the inside index as matrix rows and the outside index as matrix columns.

$$F_P = \{F(p-q), p=0,1,\ldots P, q=0,1,\ldots P\}$$

Since the matrix $F(p)$ is zero for $p<0$ and $p>P$, the matrix has nonzero submatrices only in the lower diagonal $$F_P = \begin{bmatrix} F(0) & 0 & \ldots & 0 \\ F(1) & F(0) & 0 & \ldots & 0 \\ \vdots & & & \\ F(P) & F(P-1) & \ldots & F(0) \end{bmatrix} \quad (11a)$$

Associated with $F_P$ is an upper diagonal $(P+1)T\times PM$ matrix $\overline{F}_{P-1}$ that is defined by Eq.(8)

$$\overline{F}_{P-1} = \{F(p+q+1), p=0,1,\ldots P, q=0,1,\ldots P-1\} \quad (11b)$$

The compound channel matrix $H_{PK_T}^{(d)}$ is $(P+1)M\times(P+1)K_T$ vector diagonal $$H_{PK_T}^{(d)} = \{h_m^{(d,k)} m=0,1,\ldots M-1, p=0,1,\ldots P, q=p; k=0,1,\ldots K_T-1, 0 \text{ otherwise}\}$$

where m and p are DO loop row indices and q and k are column indices, i.e., $$H_{PK_T}^{(d)} = \left(\begin{bmatrix} \underline{h}^{(d,k)} & & 0 \\ & \underline{h}^{(d,k)} & \\ & & \ddots \\ 0 & & \underline{h}^{(d,k)} \end{bmatrix}, k = 0, 1, \ldots K_T-1\right) \quad (11c)$$

so that the past interference compound vector is $$\underline{v}_n^{(d)}(P) = \overline{F}_P H_{P-1,k_T}^{(d)} \underline{\alpha}_n$$

$$\underline{\alpha}_n = \{c_{n-q-1}^{(k)}, q=0,1,\ldots P-1, k=0,1\ldots K_T-1\} \quad (12a)$$

The space-time block coder accepts a block of K information symbols $a_{n+k}$, $k=0,1,\ldots K-1$, $n \bmod L=0$, and produces coded symbols $c_{n+l}^{(k)}, l=0,1,\ldots,L-1, k=0,1,\ldots K_T-1$ for transmission of the kth L-symbol block over the kth transmit antenna port, $k=0,1,\ldots K_T-1$. In the real representation, the STBC symbol vector of length 2L for the kth transmit antenna port is found by multiplying an STBC matrix $S^{(k)}, k=0,1,\ldots K_T-1$ by the real $2K_T$ length information symbol vector. For example, for the Alamouti code, the STBC matrices are $$S^{(0)} = \begin{bmatrix} 1 & 0 & 0 & 0 \\ 0 & 1 & 0 & 0 \\ 0 & 0 & -1 & 0 \\ 0 & 0 & 0 & 1 \end{bmatrix} \quad (12b)$$

$$S^{(1)} = \begin{bmatrix} 0 & 0 & 1 & 0 \\ 0 & 0 & 0 & 1 \\ 1 & 0 & 0 & 0 \\ 0 & -1 & 0 & 0 \end{bmatrix}$$

In general the $\underline{c}_n$ vector of Eq. (9) in real notation of length $2(P+1)$ is found from the general coding relationship $$\underline{c}_n = S\underline{a}_n \quad (12c)$$

where $$\underline{a}_n = \{a_{n+p}, p=0,1,\ldots P\}, n \bmod L=0 \quad (12d)$$

and S is a real compound STBC matrix with dimensions $2K_T(P+1)\times 2(P+1)$. The matrix S contains STBC matrix subblocks $S^{(k)}, k=0,1,\ldots K_T-1$ in accordance with the Do Loop notation of Eq. (9).

The $(P+1)T$ length DFE includes the calculation of the maximum likelihood estimate of the unknown information symbol vector $\underline{a}_n$. In Eq (10b) the noise vector is white and for purposes of equalization the information symbols are assumed independent. Accordingly the dth diversity likelihood function for the received vector is found from Eqs. (10b) and (12c) to be $$L^{(d)}(\underline{r}_n^{(d)}(P)|\underline{a}_n) = \underline{a}_n'S'H_{PK_T}^{(d)'}F_P'\underline{r}_n^{(d)}(P)$$

For uncorrelated diversities the likelihood functions are added. The maximum-likelihood estimate of $\underline{a}_n$ to be used in the $(P+1)T$ length forward filter 41 are thus given by the channel matched signal $2(P+1)$ real vector $$\underline{x}_n = S' \sum_{d=0}^{D-1} H_{PK_T}^{(d)'} F_P' \underline{r}_n^{(d)}(P) \quad (13a)$$

with channel matched signal components $$x_{np}, p=0,1,\ldots,P.$$

Matched filter 40 is seen from Eq. (13a) to require first, a matched operation that depends on the compound fixed filter matrix $F_P$, and second, a matching and combining operation that depends on the diversity channel estimates in the compound channel matrix $H_{PK_T}^{(d,k)}$, and finally a decoding transformation by the compound STBC matrix S. Prior to the decoding transformation the coded matched signals are given by the complex $(P+1)K_T$ vector $$\tilde{\underline{x}}_n = \sum_{d=0}^{D-1} H_{PK_T}^{(d)'} F_P' \underline{r}_n^{(d)}(P) \quad (13b)$$

with coded matched signal components $$\tilde{x}_{np}^{(k)}, p=0,1,\ldots,P, k=0,1,\ldots K_T-1$$

and in real 2-vector notation $$\underline{x}_n = S'\tilde{\underline{x}}_n \quad (13c)$$

Since the matrix $F_P$ is lower diagonal and therefore not Toeplitz the first matching operation in the finite length DFE cannot be realized by a tapped-delay-line filter. The lower diagonal property of the compound fixed filter matrix $F_P$ insures that for each antenna port dimension k in the $P+1$ forward filter there are exactly P interferers that can be subsequently cancelled in the limit of zero additive noise.

Associated with the fixed filter contribution to Eq. (13a) there is a fixed filter matched signal vector with dimension $(P+1)M$ $$\underline{\xi}_n^{(d)} = F_P' \underline{r}_n^{(d)}(P) \quad (14a)$$

with fixed filter matched signal subvectors of order M corresponding to forward filter 41 with $P+1$ vector weights $$\underline{\xi}_{np}^{(d)} = \sum_{j=p}^{P} F'(j-p)\underline{r}_{n+j}^{(d)} \quad p = 0, 1, \ldots, P. \tag{14b}$$

Note that because of the lower diagonal and P-subblock square properties of the matrix $F_P$ in Eq. (11a) the vector operations represented by Eq. (14a) are not equivalent to TDL filtering so that the components of the fixed filter matched signal vector are nonstationary. Subsequent signals derived from the fixed filter matched signal vector must then also be nonstationary.

Figure 5:
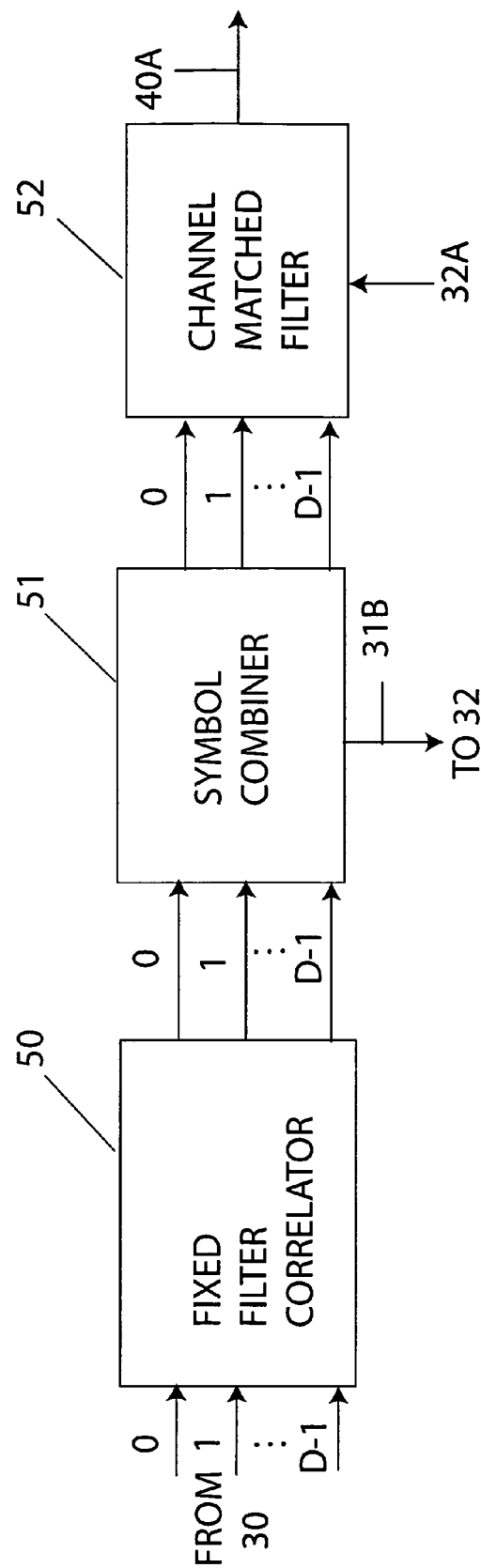
FIG. 5 is a block diagram of the matched filter in the DFE of FIG. 4.

The matched filter 40 is shown in FIG. 5. The fixed filter correlator 50 generates fixed filter correlator signals that are subsequently processed in symbol combiner 51 to produce the fixed filter matched signal vectors of Eq. (14a). The fixed filter matched signals are used in subsequent processing in DFE 31 to obtain the information symbol estimates but are also provided on 31B to channel estimator 32 for calculation of the channel estimates.

For conventional diversity configurations such as 2S/2F where $D_T=2$ using two frequency bands, $D_R=2$, $D=4$, and no STBC so K=1, the channel matched filter 52 in FIG. 5 combines the dot products for D diversities of a channel coefficient vector provided on 32A from the channel estimator 32 and fixed filter matched signal subvectors from symbol combiner 51 to produce the channel matched signal components for the nth symbol epoch. For arbitrary D and the trivial STBC example with L=1 the channel matched signal components are $$x_{np} = \sum_{d=0}^{D-1} \underline{h}^{(d,0)'} \underline{\xi}_{np}^{(d)} \quad p = 0, 1, \ldots, P \tag{15a}$$

Space-time coding applies $K_T$ different STBC modulation sequences to each of $K_T$ transmitting antenna ports. In the preferred embodiment $K_T=D_T$ and the number of received diversity signals D processed in matched filter 40 is equal to the number of receive antenna ports $D_R$. Each STBC path associated with each receive diversity d, d=0,1, . . . ,D-1 has a different channel vector $\underline{h}^{(d,k)}$, k=0,1, . . . , $K_T$-1 associated with the kth transmit antenna port so Eq.(13b) prior to decoding transformation becomes $$\tilde{x}_{np}^{(k)} = \sum_{d=0}^{D-1} \underline{h}^{(d,k)'} \underline{\xi}_{np}^{(d)}, \quad k = 0, 1, \ldots K_T - 1 \tag{15b}$$

The decoding transformation Eq, (13c) on the components in Eq. (15b) results in the channel matched signals $\underline{x}_n$ that is the output 40A of the matched filter in FIG. 4 and 5. In an alternative embodiment to be described subsequently, the Dth order diversity summation is postponed until after future ISI equalization in forward filter 41.

The pth vector produced by symbol combiner 51 according to Eq. (14b) combines signal components corresponding to the coded symbol sent in the n+p symbol epoch. The symbol combining is accomplished iteratively by adding symbol combined subvectors from previous symbol epochs and outputs from the fixed filter correlator 50 for the latest symbol epoch. For the nth data symbol epoch in the block n=0,1, . . . N-1, the symbol combiner 51 computes the fixed filter matched signals $$\underline{\xi}_{nP}^{(d)} = \underline{q}_{n+P,0}^{(d)}$$

and $$\underline{\xi}_{n,p}^{(d)} = \underline{\xi}_{n-1,p+1}^{(d)} + \underline{q}_{n+P,P-p}^{(d)} \, p=0,1, \ldots, P-1 \tag{16}$$

where components of the fixed filter correlation vector $$\underline{q}_{n,l}^{(d)} = F'(l)\underline{r}_n^{(d)} \tag{17}$$

are computed in fixed filter correlator 50.

For a block whose first symbol is denoted n=0, the iteration in Eq. (16) is computed for n≥-P with initialization of the fixed filter matched signals $$\underline{\xi}_{-p,P}^{(d)} = \underline{q}_{P-p,o}^{(d)}, p=1, \ldots, P \tag{18a}$$

$$\underline{\xi}_{-P,p}^{(d)} = \underline{0}, p=0,1, \ldots P-1 \tag{18b}$$

The components of the fixed filter correlation vector Eq. (17) are represented by the integral for indices m=0,1, . . . , M-1, l=0,1, . . . ,P-1,d=0,1, . . . ,D-1

$$q_{nlm}^{(d)} = \int_0^T f(t - mT/Q + lT)r^{(d)}(t + nT)\,dt \tag{19}$$

The implementation of the fixed filter integration in Eq. (19) may be performed with an analog filter at an intermediate frequency or at baseband. In the preferred embodiment the received signals are digitalized with an input sampling rate of $Q_I/T$ and an FIR filter with $IQ_I$ coefficients is used to compute the integral in Eq. (19). For spectral control it may be desirable to choose the input sampling rate $Q_I/T$ greater than the channel sampling rate Q/T.

The correlator/combiner combination in the present invention of fixed filter correlator 50 and symbol combiner 51 produce for each estimation interval, n mod L=0, fixed filter matched signals $\underline{\xi}_{n,p}^{(d)}$, p=0,1, . . . P, with P+1 dimensions containing a desired information symbol component and P ISI contributors. These fixed filter matched signals do not have stationary statistics because of the lower diagonal and P-subblock square properties of the matrix $F_P$. The subsequent processing of these nonstationary signals in P+1 dimension forward filter 41 can exactly cancel the P interferers with either a zero-forcing constraint or in the zero noise limit with a MMSE constraint. A conventional matched filter within a DFE cascades an FIR filter for the fixed filter component with an FIR channel matched filter. The two FIR filters must have tap spacing less than the symbol interval T to meet the Nyquist criterion. This conventional solution produces stationary signals with ISI contributors that are equal to or greater than the symbol dimensions in the forward TDL filter of a finite length DFE so that exact cancellation is only possible in the infinite length DFE described in Feedback Equalization. This nonstationary signal difference is the basis for the optimality of the finite length DFE of the present invention relative to conventional solutions based on the truncated infinite length DFE. This advantage is important because the absence of residual future ISI improves bit error rate performance in a communications application and additionally, provides convenient testing and debugging of the receiver during implementation.

At high symbol rates the number of complex multiplies per symbol required in matched filter 40 dominates the complexity of diversity DFE receiver 12 in a multiple diversity configuration. For the calculation of the components of the fixed filter correlation vector in Eq. (19), the fixed filter impulse response has $IQ_I$ samples so there are $IQ_I$ possible time shifts for nonzero integration results for each of $Q_I$ received samples within the T-integration. The number of complex multiplies (CM) per symbol for the fixed filter correlator (FFC) 50 is then $$CM_{FFC}/T = \frac{1}{2}DIQ_I^2$$

where the factor of ½ is because f(t) is real. The number of complex multiples for the channel matched filter 52 in FIG. 5 is from Eq. (15a)

$$CM_{CMF}/T=DM(P+1)$$

In a high data rate troposcatter application at a QPSK symbol rate $1/T=15E6$ symbols/second, typical parameters could be Diversity order=D=4
SRRC length in symbols=I=4
SRRC samples per symbols=$Q_I$=4
Channel samples per symbol=Q=2
Channel coefficients per diversity=M=15
Number of future ISI values=P=10

The CM/T per diversity for the fixed filter correlator 50 and the channel matched filter 52 are 128 and 165, respectively.

The present invention includes the decomposition of the matched filter function in the DFE into a fixed filter subsystem comprising fixed filter correlator 50 and symbol combiner 51 and a channel filter subsystem comprising channel matched filter 52. The required number of complex multiplies in the matched filter function dominates the complexity of the DFE. In this decomposition the properties of the fixed filter can be exploited as described above to reduce the required number of complex multiplies. Channel estimation complexity is also reduced because only the unknown channel coefficients need to be estimated. In contrast in Finite Length DFE and Fast Computation the matched filter function is included in a single fractional tap-spaced vector forward filter. The transmitter fixed filter required in any practical implementation is included in the channel response. Consequently its properties cannot be exploited to reduce signal processing complexity. Moreover, although Finite Length DFE and Fast Computation do not include a method for channel estimation, the number of coefficients to be estimated in the channel response is (I+C)QD whereas the present invention requires MD. For the parameters above in the troposcatter application, the number of coefficients to estimate are 88 for Finite Length DFE and 60 for the present invention.

The fixed filter f(t) is known by receiver 12 and the path delay indices are determined by channel estimator 32. Although the description of the present invention used a continuous set of multipath delay values, it is recognized that a noncontinuous set of M multipath delay values may also be used in the invention. For example, the channel estimator 32 may find $M_1$ channel coefficients for each diversity and further select the largest $M_2<M_1D$ coefficients to be used in the D diversity matched filter 40. In this example the number of channel coefficients and the path delay values may differ from diversity to diversity. One of ordinary skill would recognize that the matched filter equations presented here can be modified for M (d) channel coefficients and a path delay $\Delta$ (m,d) T/Q for diversity $0 \leq d \leq D-1$ and path indices $0 \leq m \leq M(d)-1$.

Forward Filter and Backward Filter

The forward filter 41 in FIG. 4 in DFE 31 in FIG. 3 accepts matched signal components defined in Eq. (13c). With no STBC all of the D receiver diversity signals are combined resulting in the single user output Eq. (15a). With a STBC the output of the matched filter includes $D=D_R$ combining and STBC decoding according to Eq. (13c). Although the present invention is a single-user system the use of STBC requires transmission and reception of $K_T>1$ different source sequences analogous to the multiuser system described in copending Multiuser Equalization. Because there is a different channel vector for each $K_TD$ transmit antenna/diversity path, Eq. (11c) is extended to the compound channel $$H_{PK_TD}=\{H_{PK_T}^{(d)}, d=0,1,\ldots D-1\} \qquad (20)$$

where the indices represent submatrix columns. In Multiuser Equalization the parameters for a multiuser DFE are derived for a K-user system where the received signal can be expressed in the compound vector form $$\underline{r}_n = G\underline{a}_n + F\underline{\alpha}_n + \underline{u}_n \qquad (21)$$

where using the fixed filter matrices defined in Eq. (11) one has in this single-user STBC application $$G=F_{PD}H_{PK_TD}S \qquad (22)$$

$$F=\overline{F}P_{P-1,D}H_{(P-1)K_TD}S \qquad (23)$$

where $F_{PD}$ and $\underline{F}_{P-1,D}$ are subblock diagonal matrices with diversity designated diagonal submatrix elements of $F_P$ and $\underline{F}_{P-1}$, respectively. The compound vectors including the receive diversity components are defined for the received signal $$\underline{r}_n=\{\underline{r}_n^{(d)}(P), d=0,1,\ldots D-1\} \qquad (24a)$$

and the noise signal $$\underline{u}_n=\{\underline{u}_n^{(d)}(P), d=0,1,\ldots,D-1\} \qquad (24b)$$

Since radio systems require power amplifiers with a peak power limitation, Offset Quadrature Phase-Shift Keying (OQPSK) is sometimes used to reduce spectral emissions due to bandlimiting and power amplifier nonlinearities. The half-symbol offset in OQPSK can be represented within the definition of Eq. (21) such that the STBC and DFE can equally well function with this type of modulation. For OQPSK the information symbol vectors $\underline{a}_n$ and $\underline{\alpha}_n$ are in the real 2-vector format and the matrices G and F in real 2-vector representation require respective fixed filter matrices $F_P$ and $\underline{F}_{P-1}$ that account for the half-symbol offset. Subsequent matched filter, forward filter, and backward filter operations for OQPSK use the equations presented here but with the real 2-vector arithmetic.

For determining the parameters in the MMSE solution for the forward and backward filters, it is not necessary to compute either G or F but instead smaller matrices comprising a forward transfer matrix G'G and a backward transfer matrix G'F. The calculation of these matrices is described subsequently.

The MMSE STBC solution includes a matched filter with channel matched signals $\underline{x}_n$ as given in Eq. (13c) and provided on 40A to forward filter 41. The forward filter 41 performs the dot product of the forward filter vectors and the channel matched signal vector $\underline{x}_n$. The operations described in the previous section to obtain the channel matched signals $\underline{x}_n$ can be summarized by the matched filter vector equation $$\underline{x}_n = G' \underline{r}_n \quad (25a)$$

In terms of the transmitted coded symbols, one then has $$\underline{x}_n = R\underline{a}_n + G'F\underline{a}_n + \underline{v}_n \quad (25b)$$

where $$R = G'G$$

and $$\underline{v}_n = G'\underline{u}_n$$

is a zero mean complex Gaussian noise vector with covariance matrix $$E(\underline{v}_n \underline{v}_n') = \sigma^2 R$$

where E( ) is the expected value operator.

The solution in Multiuser Equalization requires K different solutions for the DFE parameters and the K solutions are used for each of the N symbol times in a receiver time block. In the present single-user STBC application for a rate K/L code comprising $K_T$ transmit antenna ports and L symbols in the STBC block, there are K DFE solutions that are used for every symbol index that satisfies n mod L=0. For STBC equalization each of the K solutions includes a forward filter vector $\underline{y}_k$ that minimizes the mean square error with respect to the information symbol $a_{n+k}$. The K backward filter vector solutions cancel the past ISI contained in the vector $\underline{x}_n$.

(a) Single $K_T$-block Equalization

It is useful in describing the role of the equalization in this STBC application to consider first an idealized example without error correction coding/interleaving and transmission of a single $K_T$-block group. In this idealized example there is no interference between successive code blocks because only one group of $K_T$ code blocks is sent over the $K_T$ transmit antenna ports. In the absence of code block interference, equalization reduces to matched filtering and maximum-likelihood (ML) detection is possible. This detection requires the ML estimates $x_{nk}$ of the STBC information symbol $a_{n+k}$. As an example, the Alamouti code described in Transmit Diversity has code rate of unity with $L=K_T=K=2$ and code blocks containing the coded symbols $$c_n^{(0)} = a_n \quad c_n^{(1)} = a_{n+1} \quad (26a)$$

$$c_{n+1}^{(0)} = -a_{n+1}^* \quad c_{n+1}^{(1)} = a_n^* \quad (26b)$$

where the superscript denotes the transmit antenna. For the preferred embodiment the information symbols $a_n$ and $a_{n+1}$ to the space-time block coder are MPSK symbols with values from the set $\exp(j2\pi m/M + j\pi \Delta_M/4)$, m=0,1, ... M−1, $\Delta_M=1$, M=4, $\Delta_M=0$, otherwise. In an idealized single $K_T$-block transmission, only the information symbols $a_n$ and $a_{n+1}$ are transmitted. The sufficient statistics are matched filter 40 outputs $$x_{nk}, k=0,1 \quad (27)$$

that were shown in the previous section to be ML estimates of coded symbols $a_{n+k}$.

Since there is no code block ISI in this single 2-block transmission example these ML estimates are then quantized to the closest possibly transmitted information symbol to complete the detection process. For QPSK, for example, the quantized values are obtained by taking the sign of the real and imaginary parts of the estimate, i.e., $$\hat{a}_n = csgn(x_{n0}) \quad (28a)$$

$$\hat{a}_{n+1} = csgn(x_{n1}) \quad (28b)$$

where c sgn(u+jv)=sgn(u)+j sgn(v).

Using Eqs. (10b) and (13), the single $K_T$-block sufficient statistics are obtained from the compound vector at matched filter 40 output as $$\underline{x}_n = \sum_{d=0}^{D-1} S' H_{PK_T}^{(d)'} F_P' F_P H_{PK_T}^{(d)} S\underline{a}_n + \underline{v}_n \quad (29)$$

The information symbol estimates $x_{n0}$ and $x_{n1}$ in Eq.(28) include colored noise terms from the additive noise vector $\underline{v}_n$. For the Alamouti code L=2 when the DFE symbol span P+1 satisfies the constraint of Eq.(2) the estimates from Eq. (28) are equal to $$x_{n0} = \sum_{d=0}^{D-1} \sum_{k=0}^{1} \underline{h}^{(d,k)'} \Phi_P(0,0) \underline{h}^{(d,k)} a_n + \tilde{v}_n$$

$$x_{n1} = \sum_{d=0}^{D-1} \sum_{k=0}^{1} \underline{h}^{(d,k)'} \Phi_P(0,0) \underline{h}^{(d,k)} a_{n+1} + \tilde{v}_{n+1}$$

The coefficients $\tilde{v}_n$ and $\tilde{v}_{n+1}$ are uncorrelated additive noise contributions and $\Phi_P(p,q)$ is an M×M subblock of the fixed filter correlation matrix defined subsequently in Eq. (40a). For additive Gaussian noise, the absence of noise correlation verifies that $x_{n0}$ and $x_{n1}$ are the maximum-likelihood estimates of the STBC information symbols. Computing the signal-to-noise ratio for this idealized single K-block transmission, the result is $$SNR = \sigma^{-2} \sum_{d=0}^{D-1} \sum_{k=0}^{1} \underline{h}^{(d,k)'} \Phi_P'(0,0) \underline{h}^{(d,k)} \quad (30)$$

where $\sigma^2$ is the additive noise power in the symbol rate bandwidth. This result shows that the Alamouti code with single $K_T$-block transmission and maximum-likelihood estimation realizes all the transmitter ($K_T$=2 order), receiver (D order), and multipath (M order) diversity.

(b) Equalization for Successive STBC Blocks with ISI

The MMSE DFE provides cancellation of the past ISI prior to the nth detection interval and equalization of future ISI and additive noise effects so as to minimize the "ISI penalty" relative to the idealized SNR obtained with a single $K_T$-block transmission.

In a practical successive STBC block transmission system with ISI resulting from time-adjacent STBC blocks the MMSE estimate of $a_{n+k}$ is not equal to the ML estimate $x_{nk}$ because of the past and future ISI. Equalization to minimize these effects will result in an SNR generally poorer than Eq. (30) with the ratio difference called the ISI penalty. The MMSE DFE minimizes this ISI penalty. Note that in this STBC application the maximum likelihood sequence estimator (MLSE) can generally decode the ISI structure with no ISI penalty or smaller ISI penalty than the DFE. However the MLSE is nonlinear and grows exponentially with the ISI duration rather than the linear growth in complexity with the DFE.

(c) STBC MMSE DFE Solution

The MMSE formulation for the DFE for symbol indices when n mod L=0 requires K dot products corresponding to K unknown information symbols, viz., $$y_{nk} = \underline{\gamma}'_k \underline{x}_n \quad (31)$$

$$\min_{\underline{\gamma}_k} E|\underline{\gamma}'_k \underline{x}_n - a_{n+k}|^2 \quad k=0,1,\ldots,K-1 \quad (32)$$

Because the channel matched filter signals $\underline{x}_n$ were obtained from Eq.(13c) with real 2-vector notation involving the STBC matrix S, the equations in this section must also be performed using real 2-vector operations when STBC is employed. In the notation for these operations $\underline{x}_n$ is a 2(P+1) real vector, the forward filter vector $\underline{\gamma}_k$ is a real 2×2(P+1) matrix and the dot product $y_{nk}$ is the real 2-vector representation of a complex scalar.

The backward filter 42 will cancel past ISI so the forward filter solution can be found assuming the past ISI is not present. The solution for the forward filter vector $\underline{\gamma}_k$ is found from the orthogonality principal $$E\underline{x}_n(\underline{\gamma}'_k \underline{x}_n - a_{n+k})' = \underline{0}$$

The information symbols are taken as independent so $$E(\underline{a}_n \underline{a}_n') = I$$

One also needs the source correlation vectors $$E_k = E(\underline{a}_n a_{n+k}') \; k=0,1,\ldots,K-1$$

In terms of these STBC source statistics, the MMSE formulation leads to the simultaneous equations $$(R^2 + \sigma^2 R)\underline{\gamma}_k = RE_k$$

where R=G'G and $E_k$ is a 2(P+1)×2 real vector with $$E_k = [\underline{e}_{2k} \underline{e}_{2k+1}], \; \underline{e}_i = \{1 i=p, 0 \text{ otherwise}\}$$

In the absence of STBC, K=1, complex vector arithmetic is used and $E_0$ is a (P+1)×1 vector equal to $\underline{e}_0$.

The MMSE solution is then of the form $$\underline{\gamma}_k = \Delta E_k \quad (33)$$

where $$\Delta = (R + \sigma^2 I)^{-1} \quad (34)$$

In Eq. (34) above $\sigma^2$ represents an estimation of the additive noise. As an alternative to the preferred MMSE solution with $\sigma^2 > 0$ the zero-forcing solution results in perfect ISI cancellation when $\sigma^2$ is set to zero. The matrix inverse required in Eq. (34) is the same for all K solutions. The inverse can be calculated using a Cholesky decomposition as described, for example, in A. A. Giordano and F. M. Hsu, *Least Square Estimation with Application to Digital Signal Processing*, John Wiley and Sons, New York, N.Y., 1985, Chapter 3.3.

The forward filter 41 computes the dot products for the K consecutive symbol outputs beginning at a symbol index n that satisfies n mod L=0.

$$y_{nk} = \underline{\gamma}'_k \underline{x}_n \; n \bmod L=0, k=0,1,\ldots K-1 \quad (35)$$

Note that this estimate of the information symbol contains interference from symbols in previous STBC blocks. The backward filter 42 to be described subsequently computes past interference signals $b_{nk}$ that are combined with the dot product of Eq. (35) to provide a soft decision value that is the DFE MMSE estimate of the information symbol $a_{n+k}$. This estimate is $$z_{nk} = y_{nk} + b_{nk} \; n \bmod L = 0, k=0,1,\ldots K-1 \quad (36)$$

Figure 6:
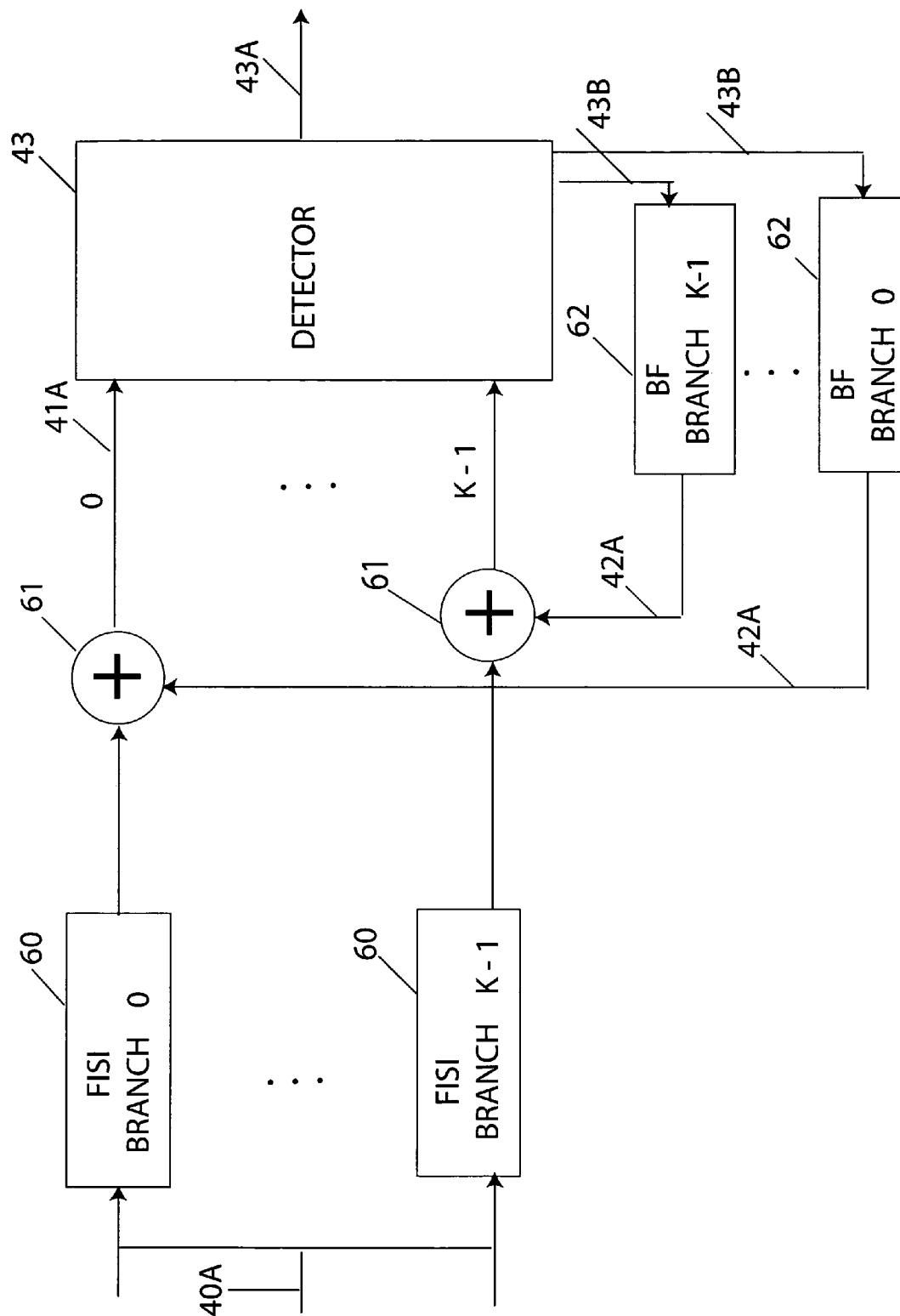
FIG. 6 is a block diagram of the intersymbol interference (ISI) subsystems in the DFE of FIG. 4.

In FIG. 6 the ISI equalizer comprising the forward filter 41, backward filter 42, and detector 43 of DFE 31 for a K/L STBC is shown. The forward filter 41 contains K FISI (future ISI) filter branches 60 that form the K-successive dot products of Eq. (31) between the input 52A and the kth symbol FISI vector 60, Eq. (33).

The K-branch DFE is an STBC decoder with information symbol estimates as outputs. For purposes of past ISI cancellation in backward filter 42, the detector 43 generates detected values corresponding to the STBC information symbols $a_{n+k}$, k=0,1,...,K−1.

Information symbol estimates are deinterleaved and error-correction decoded in deinterleaver and decoder 34 to produce the reconstructed transmitted digital data information. The information symbol estimates contain channel quality information so their use in the subsequent deinterleaving and decoding results in a soft-decision decoding advantage. For purposes of past ISI cancellation the information symbol estimates are quantized to the closest possibly transmitted information symbol. For QPSK, for example, the quantized values are obtained by taking the sign of the real and imaginary parts of the information symbol estimate. For the Alamouti code the symbol decisions $\hat{a}_n$ and $\hat{a}_{n+1}$, are the respective quantized values of $z_{n,0}$ and $z_{n,1}$ in Eq.(36) above.

The information symbol decisions are provided on 43a to backward filter 42 for processing to provide cancellation of past ISI at the detector input 41A. The information symbol decision vector for the nth estimation interval is $$\hat{\underline{a}}_n = \{\hat{a}_{n-p}, p=1,\ldots P\}.$$

The K past interference signals 42A at the nth estimation interval, n mod L=0, of BF branches 62 in FIG. 6 for past ISI cancellation are $$b_{nk} = -\underline{\gamma}'_k G'F \hat{\underline{a}}_n \quad (37a)$$

so the kth symbol BF branch vectors are $$\underline{\beta}_k = F'G\underline{\gamma}_k \; k=0,1,\ldots,K-1 \quad (37b)$$

Combining of the FISI and BF branches for the K-consecutive symbols according to Eq. (36) is accomplished in the K-summer set 61 in forward filter 41.

Because of the complexity associated with matched filtering and the necessity of D>1 diversity channels in many applications, a practical implementation may use chip processors such as Field Programmable Gate Arrays (FPGA) for each of the D diversity channels followed by a single chip processor that performs the subsequent operations. FPGA processors can be more limited by signal transfer rate than by the number of required multiplies. The input to forward filter 41 in Eq.(13a) requires a signal transfer rate P+1 times the symbol rate. The dot product results of Eq. (35) that are computed in forward filter 41 require a transfer rate equal to or less (K/L) than the symbol rate. An alternative embodiment postpones the diversity combining of Eq. (13a) until after STBC decoding and forward filter dot products are performed on each diversity. The diversity outputs of the dth, d=0,1,... D−1, chip processor are then $$y_{nk}^{(d)} = \underline{\gamma}'_k S' H_{PK_T}^{(d)} F_P' \underline{r}_n^{(d)}(P), k=0,1,\ldots K-1$$

These diversity outputs are transferred to the single chip processor where the diversity sum is performed to obtain the forward filter signal $y_{nk}$ of Eq. (35).

Calculation for the past interference signal Eq. (37a) for past ISI cancellation after future ISI equalization in forward filter 41 is the preferred embodiment because it favors pipeline operations in implementation. An alternative embodiment wherein a past interference signal is computed for past ISI cancellation before future ISI equalization offers the advantage of a smaller number of required multiplication operations. In this alternative embodiment the past interference signal is $$\underline{b}_n = -G'F\underline{\hat{a}}_n. \tag{38a}$$

Past ISI cancellation in this alternative embodiment is performed in the channel matched filter by summing a combined matched filter signal calculated according to Eq. (25a) with the past interference signal to obtain the channel matched signals, viz., $$\underline{x}_n = G'\underline{r}_n + \underline{b}_n.$$

Equalizer Parameter Calculations

The vector weights of forward filter 41 require the calculation of the P+1 rank G'G forward transfer matrix and the vector weights of the backward filter 42 require the calculation of the (P+1)×P G'F backward transfer matrix. Because of the diversity combining in the matched filter these matrices have the form $$G'G = \sum_{d=0}^{D-1} G^{(d)'} G^{(d)}$$

$$G'F = \sum_{d=0}^{D-1} G^{(d)'} F^{(d)}$$

and the matrix $G^{(d)}$ is lower diagonal because it represents anticausal future ISI and $F^{(d)}$ is upper diagonal because it represents causal past ISI. The matrices G and F are given in Eqs. (22) and (23), respectively, and using the definition for the super channel matrix in Eq. (20) the diversity submatrices are $$G^{(d)} = F_P H_{PK_T}^{(d)} S$$

$$F^{(d)} = \underline{F}_{P-1} H_{(P-1)K_T}^{(d)} S$$

and the product matrices are $$G^{(d)'} G^{(d)} = S' H_{PK_T}^{(d)'} F_P' F_P H_{PK_T}^{(d)} S \tag{39a}$$

$$G^{(d)'} F^{(d)} = S' H_{PK_T}^{(d)'} F_P' \overline{F}_{P-1} H_{(P-1)K_T}^{(d)} S \tag{39b}$$

The inner matrices in Eq. (39) can be computed with complex arithmetic and converted to real 2-vector notation for the coding transformation involving the STBC matrix S. Let these inner matrices be defined as $$\Omega^{(d)} = H_{PK_T}^{(d)'} F_P' F_P H_{PK_T}^{(d)}$$

$$\overline{\Omega}^{(d)} = H_{PK_T}^{(d)'} F_P' \overline{F}_{P-1} H_{(P-1)K_T}^{(d)}$$

The fixed filter correlation matrices in Eq. (39) can be computed in advance and stored for use in the parameter calculations. The M×M subblocks of these matrices are defined as $$\Phi_P(p,q) = (F_P' F_P)_{pq} \; p=0,1,\ldots,P, q=0,1,\ldots,P \tag{40a}$$

$$\overline{\Phi}_P(p,q) = (F_P' \overline{F}_{P-1})_{pq} \; p=0,1,\ldots,P, q=0,1,\ldots,P-1 \tag{40b}$$

Because of the vector diagonal nature of the channel matrices, see Eq. (11c), the components of the inner matrices are computed as the quadratic forms $$(\Omega^{(d)})_{kp,lq} = \underline{h}_{dk}' \Phi_P(p,q) \underline{h}_{dl} \; k=0,1,\ldots K_T-1, l=0,1,\ldots, K_T-1 \; p=0,1,\ldots,P, q=0,1,\ldots,P \tag{41a}$$

$$(\overline{\Omega}^{(d)})_{kp,lq} = \underline{h}_{dk}' \overline{\Phi}_{P-1}(p,q) \underline{h}_{dl} \; k=0,1,\ldots K_T-1, l=0,1,\ldots, K_T-1 \; p=0,1,\ldots,P, q=0,1,\ldots,P-1 \tag{41b}$$

Channel Estimation

In a block processing application channel estimation can be accomplished by transmitting within the block a subblock of reference symbols. The reference symbols are known at the receiver so that channel estimation by correlation techniques is possible. When the subblock is at the beginning of the block, it is called a preamble. The preamble choice offers two advantages. First, since channel estimation must precede equalization processing, pipeline operations are facilitated with a preamble. Second, with either a time guard or frequency hopping, the beginning of the preamble is uncorrupted by unknown digital data resulting in an improved channel estimate. The advantage of a reference subblock in the middle of the receiver time block, i.e. a midamble, is that the required channel stationary time is reduced by about one-half. At high data rates relative to the frequency spread, the preamble is generally the better choice so the preferred embodiment for the channel estimation uses the preamble formulation. It is understood that the described invention would also function with a midamble but with either some channel estimation degradation or the dedication of the first few symbols in the midamble as a time guard to preclude corruption by unknown symbols.

Figure 7:
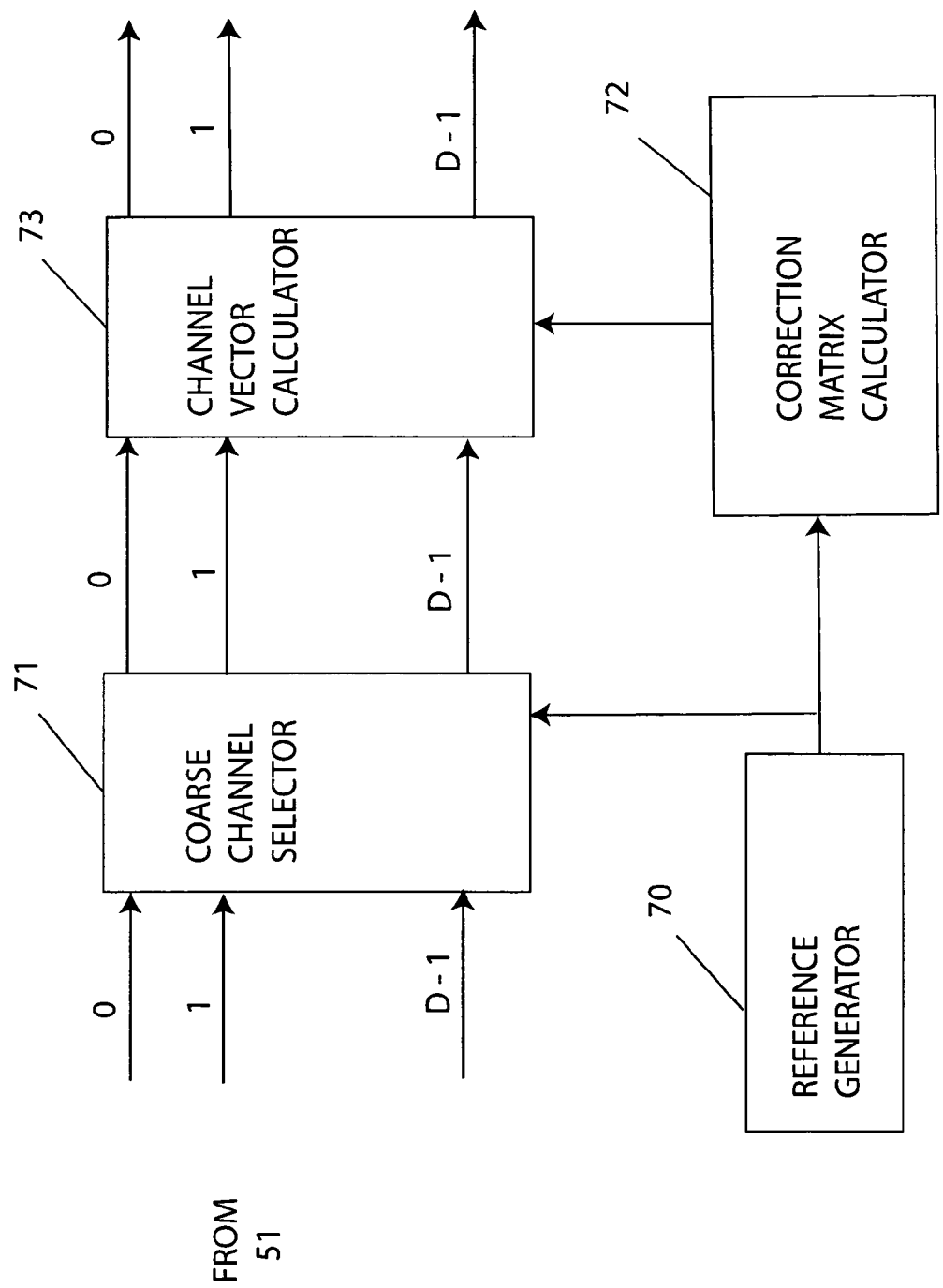
FIG. 7 is a block diagram of the channel estimator in the $D_R$-antenna receiver of FIG. 3.

In FIG. 7 the channel estimator 32 of receiver 12 is shown to include a reference generator 70 for producing the $K_T$ unique reference symbol sequences sent on each of the $K_T$ transmit antenna ports. The channel estimates are a result of correlation between the D received signals and the $K_T$ reference symbol sequences. For a reference preamble of length J symbols with no contributions due to unknown symbols in the received signal over an interval of JT seconds, the received signal for diversity d can be written as in Eq. (7b) with the first reference symbol indexed as n=0 and the past interference signal $\underline{v}_P^{(d)}$ equal to zero.

$$\underline{r}_j^{(d)} = \sum_{q=0}^{j} F(j-q) \sum_{k=0}^{K_T-1} \underline{h}^{(d,k)} a_q^{(k)} + \underline{u}_j^{(d)} \quad 0 \leq j \leq J-1 \tag{42}$$

Each of the $K_T$ transmit antenna ports sends a unique reference signal $\underline{a}_q^{(k)}$, $0 \leq q \leq J-1, 0 \leq k \leq K_T-1$, and these reference signals are produced at the receiver in reference generator 70. Note that the reference signals are not space-time coded. Because of possible correlation between the reference signals, optimum channel estimation finds the compound channel vector of dimension $K_T M$ $$\underline{h}^{(d)} = \{\underline{h}^{(d,k)}, k=0,1,\ldots,K_T-1\} \tag{43}$$

In most applications the D diversity channels are statistically independent so that channel estimation can be performed separately for each diversity. When this is not the case, one extends the technique described here in a straightforward manner for a larger compound vector including the correlated diversities.

The optimum channel estimator is determined after recasting Eq. (42) into a form dependent on the unknown channel vector $\underline{h}^{(d)}$. Using the definitions in Eq. (10a) and (10b) with P replaced by J−1 and defining the JM×$K_T$M reference source matrix $$A_{JK} = \{a_{[(jM+m)/M]}^{(k)} I_M, j=0,1,\ldots,J-1, m=0,1,\ldots,M-1, k=0,1,\ldots,K_T-1\}$$

where [ ] is the lower integer and $I_M$ is the M rank identity matrix, one can then write the received signal due to the preamble as $$\underline{r}_0^{(d)}(J-1) = F_{J-1} A_{JK_T} \underline{h}^{(d)} + \underline{u}_0^{(d)}(J-1) \quad (44)$$

Since the additive noise term is white, the optimum estimator first computes the coarse estimate that is produced by coarse channel selector 71.

$$\underline{\tilde{h}}^{(d)} = A'_{JK_T} F'_{J-1} \underline{r}_0^{(d)}(J-1) \quad (45)$$

The calculation of the coarse estimate in Eq. (45) includes terms that have already been computed in symbol combiner 51 during the received signal interval containing the reference signals. Consider the compound vector of rank JM in Eq. (45)

$$\underline{\lambda}^{(d)}(J-1) = F'_{J-1} \underline{r}_0^{(d)}(J-1)$$

and the jth subvectors of rank M defined by $$\underline{\lambda}^{(d)}(J-1) = \{\underline{\lambda}_j^{(d)}; j=0,1,\ldots,J-1\}.$$

Using the definitions of Eqs. (11a) and (10a), these subvectors can be expressed as the matrix equations $$\underline{\lambda}_j^{(d)} = \sum_{l=0}^{P} F'(l) \underline{r}_{j+l}^{(d)} \quad j = 0, 1, \ldots, J-P-1$$

$$\underline{\lambda}_{J-p}^{(d)} = \sum_{l=0}^{p-1} F'(l) \underline{r}_{J-p+l}^{(d)} \quad p = 1, \ldots, P$$

However these subvectors are available at symbol combiner 51 output as examination of Eq.(14b) shows that $$\underline{\lambda}_j^{(d)} = \underline{\xi}_{j,0}^{(d)} \quad j=0,1,\ldots,J-P-1$$

$$\underline{\lambda}_{J-p}^{(d)} = \underline{\xi}_{J-P-1,P+1-p}^{(d)} \quad p=1,\ldots,P$$

Because the reference source matrix in Eq. (45) contains MPSK symbols in the preferred embodiment, the computation in Eq. (45) in coarse channel selector 71 requires no additional complex multiplications but only selection and MPSK sign modification of the appropriate symbol combiner 51 outputs according to the above equations.

The optimum estimator requires the calculation of a reference correlation matrix $$\psi = A'_{JK_T} F'_{J-1} F_{J-1} A_{JK_T}$$

This reference correlation matrix is computed using the compound matrix $\Phi_P$ defined in Eq. (40a) with P replaced by J−1 and since the reference source matrix has a diagonal subblock structure, one has $$\Psi = \sum_{p=0}^{J-1} \sum_{q=0}^{J-1} a_p^* \Phi_{J-1}(p,q) a_q$$

The optimum estimate requires the inversion of this $K_T$M rank matrix to give $$\underline{\hat{h}}^{(d)} = \psi^{-1} \underline{\tilde{h}}^{(d)}, \quad d=0,1\ldots D-1 \quad (46)$$

When the set of multipath delays are continuous, the inverted matrix $\psi^{-1}$ can be precomputed for the known preamble and fixed number of channel coefficients M and stored in correction matrix calculator 72. Thus for channel estimation in the present invention the only additional calculations in a pipeline implementation are the MPSK sign modifications of symbol combiner 51 outputs and the matrix multiplication in channel vector calculator 73 according to Eq. (46).

Antenna Alignment in Troposcatter Systems

In troposcatter systems the antenna configuration is typically symmetrical, i.e. $D_T = D_R$, because the communication system is full duplex. For the most common antenna configuration where $D_T = 2$ and the antennas are horizontally separated, there are four transmit/receive diversity paths corresponding to two straight paths between respective transmit and receive antennas and two cross paths between nonrespective transmit and receive antennas. When the transmissions are all in the same frequency band, this configuration is called Quadruple Space or 4S diversity. Experimental studies, for example as reported in *Quadruple Space Diversity in Troposcatter Systems*, Marconi Rev., 28-55, First Quarter, 1980, have shown that the two cross paths may be statistically correlated resulting in less than quadruple diversity. Adjustments to antenna alignment particularly in elevation can reduce the cross path diversity correlation with a possibly small elevation loss. Angle diversity systems can also benefit from correlation measurements. In these applications diversity correlation statistics are computed from Eq. (46) for use in either manual or electronically controlled antenna alignment in order to optimize fading performance.

Single Antenna Solution in Troposcatter Systems

Figure 8:
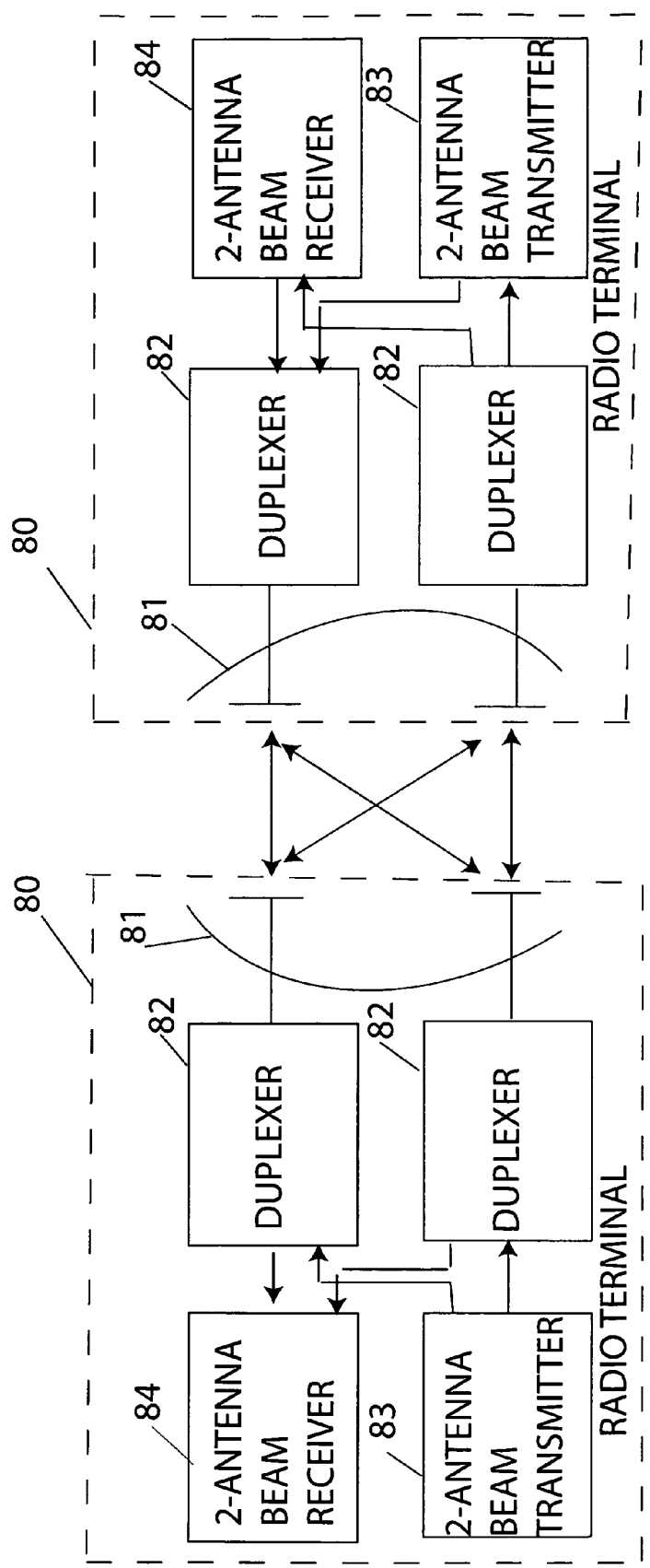
FIG. 8 is a block diagram of a single-antenna quadruple angle diversity system.

Because troposcatter systems normally require two antennas, system cost is typically significantly more than satellite systems and transport mobility is greatly reduced. Moreover, the fading dispersive nature of the troposcatter channel produces poorer performance than achievable in satellite systems. A technique is described for employing a single antenna at each end of a troposcatter link in order to realize almost the same performance as in a nonfading satellite system. To achieve such performance an angle diversity system is used to provide a basis for asymptotic quadruple diversity performance and this basis is then augmented with additional diversity through bandwidth expansion. The quadruple angle diversity system is obtained by configuring the transmit and receive antennas with vertically-displaced antenna ports so as to produce vertically splayed beams. Vertical displacement is superior to horizontal displacement because the squint loss is smaller for vertically splayed beams in troposcatter applications. At the transmitting terminal digital data information is error-corrected code and interleaved to produce a sequence of information symbols that are grouped into a periodic data frame. Subsequently an STBC code takes two information symbols at a time and produces two blocks of L≧2 coded symbols according to a space-time codebook for transmission at a coded symbol rate on the respective two transmit antenna ports. For example for L=2 the Alamouti unity rate code defined in Eq. (12b) can be used. Because four spatial paths are required for quadruple diversity, the signals in one direction of transmission, e.g., transmit signals at the near terminal and receive signals at the far terminal, have the same polarization. Note that they can have the orthogonal polarization in the other direction thus reducing the transmitter/receiver rejection required in a duplexer. This is in contrast to the 2S/2A diversity system described earlier where elevated and main beam signals are on orthogonal polarizations. In conventional duplex operation duplexers are used to separate transmit and receive signals using frequency and polarization as discriminants. FIG. 8 illustrates two radio terminals 80 in a duplex link configuration with quadruple angle diversity. A 2-antenna-port transmitter 83 as shown in FIG. 2 provides two up-converted and amplified STBC transmit signals to duplexer 82. After transmitter/receiver separation in duplexer 82 these transmit signals are sent from the two antenna ports of antenna 81. A 2-antenna-port receiver 84 as shown in FIG. 3 is used after duplexer 82 to process receive signals also from the two antenna ports of antenna 81. In a preferred embodiment in one radio terminal 80 the transmit signals and receive signals are on orthogonal polarizations while the transmit signals for one radio terminal 80 and the receive signals at the distant radio terminal 80 are on the same polarization. DFE 31 as shown in FIG. 4 processes the two receive signals to realize the STBC decoding to obtain the combination of dual transmit and dual receive diversity and to combine multipath returns for implicit diversity improvement while reducing ISI effects. Because of the squint loss full quadruple diversity performance is approached but not attained. Implicit diversity due to frequency selective fading provides further diversity protection when the data rate is high enough such that $2\sigma_D/T$ is near unity or larger.

To augment the quadruple angle diversity and implicit diversity with additional diversity so as to approach nonfading satellite performance, bandwidth expansion techniques are used. Conventional bandwidth extension methods include (1) frequency hopping and/or (2) employing a fixed or pseudo-random Direct Sequence (DS) pattern. A practical realization of frequency hopping employs a dual frequency synthesizer with one frequency as the current hopped center frequency and the other frequency as the next hopped center frequency. This allows the transition time between frequency hops to be shorter than or on the order of a symbol interval. The frequency hop period is equal to the data frame period and the hop transitions occur at the data frame boundaries. In a preferred embodiment up-converter 25 in FIG. 2 consists of an IF converter that generates an IF bandpass signal followed by an RF converter that has an input from the dual frequency synthesizer. In the RF converter the IF bandpass signal is mixed with the current hopped synthesizer frequency to produce a hopping RF bandpass signal. In a similar manner a dual frequency synthesizer is used at the receiver to mix down hopping received signals to an IF bandpass signal. For fixed hopping patterns with a limited number of different hopping frequencies, the interleaving delay in data frame lengths should equal the number of hopping frequencies. For pseudo-random hopping over a large number of hopping frequencies an interleaving delay of four to eight data frames provides good results. DS bandwidth expansion is accomplished in spectrum control filter 24 by multiplying input data symbols by a DS waveform prior to filtering to spectral emission requirements. To further discriminate the transmit diversity signals, the DS waveforms for respective transmit antenna ports can be quasi-orthogonal with small multipath-delayed cross correlations. The DS waveform usually consists of an integer multiple number of chip symbols within the data symbol. The chip symbols can be either fixed or pseudo-random. The multiplication then consists of chip symbol modulation on top of the data symbol modulation. Instantaneous bandwidth expansion techniques such as DS modulation result in a bandwidth that is greater than the coded symbol rate. The interleaving delay with instantaneous bandwidth expansion should be at least two data frame periods with better performance at larger delays.

The above single antenna solution can be augmented to provide additional total received energy for longer range applications by using two antennas in each radio terminal 80. In a dual-transmit/dual space/dual angle (2T/2S/2A) eighth-order diversity system 2-antenna beam transmitter 83 provides through duplexer 82 respective transmit signals for the lower (main beam) of two vertically splayed beams on respective horizontally separated antennas. The four diversity beam signals, two main beam signals from the horizontally separated antennas through duplexers 82 and the two elevated beam signals are provided to the 4-antenna port receiver of FIG. 3 for eight-order diversity processing. This configuration gains approximately 3 dB due to the extra antenna plus a squint loss reduction plus asymptotic eighth versus fourth order diversity.

What is claimed is:

1. In a high data rate communication receiver, wherein received signals contain digital data information that is error-corrected coded and interleaved to provide information symbols that are subsequently combined with reference symbols to provide a frame of data symbols that are filtered with a finite duration spectrum control impulse response for transmission at the data symbol rate by one or more transmit antennas over a fading dispersive channel with an associated set of multipath delays, a method of operating said receiver to enable said receiver to provide receive signals from one or more receive antennas and to produce within a data frame successive information symbol estimates that are subsequently used to reconstruct the digital data information, comprising the steps of:

time-sampling received signals at an integer multiple, greater than one, of the data symbol rate within a receiver time block that has a time duration that is no more than one-half of the interleaving delay;

correlating the time-sampled received signals and the spectrum control impulse response to provide fixed filter correlated signals;

symbol combining the fixed filter correlated signals to provide nonstationary fixed filter matched signals, that depend on an estimation interval, corresponding to one or more information symbols and with duration equal to an integer multiple of the data symbol rate reciprocal, and that further depend on data symbol intervals within and later than the estimation interval;

estimating channel parameters associated with the receiver time block that depend on products of the reference symbols and the nonstationary fixed filter matched signals;

channel processing the nonstationary fixed filter matched signals and the channel parameters to provide channel matched signals;

computing forward and backward filter weights that functionally depend on the channel parameters;

creating past interference signals that depend on the estimation interval;

multiplying the channel matched signals and the forward filter weights and further subtracting the past interference signals to provide the information symbol estimates;

deinterleaving and decoding the information symbol estimates;

selecting, from each estimation interval containing one or more information symbol estimates, associated information symbol decisions corresponding to possible transmitted information symbols; and wherein the creating step further includes:

multiplying the backward filter weights and the information symbol decisions from previous estimation intervals.

2. The method of claim 1 wherein the estimating step further includes the steps of:

multiplying the nonstationary fixed filter matched signals by the reference symbols to provide coarse channel parameters;

reference processing the reference symbols to provide a correction matrix;

multiplying the correction matrix and coarse channel parameters.

3. The method of claim 2 wherein the forward and backward filter weights minimize the mean square error between the information symbol estimate and the associated information symbol.

4. The method of claim 1 wherein a block of K information symbols are coded according to a space-time codebook to provide $K_T \geq K$ code blocks of $L \geq K_T$ coded symbols for transmission from each of $K_T$ associated transmit antenna ports and where in the symbol combining step the number of information symbols in the estimation interval is K and the integer multiple is equal to L and the fixed matched filter signals depend on data symbol intervals associated with coded symbols transmitted at the same time or later than the first coded symbol in the code block and wherein the channel processing step further includes;

channel combining the nonstationary fixed filter matched signals and channel parameters to provide coded matched signals;

multiplying the coded matched signals and a decoder matrix that depends on the space-time codebook to provide the channel matched signals.

5. The method of claim 4 wherein the duration of the spectrum control impulse response spans I data symbols and the set of multipath delays spans a duration of C data symbols and the symbol combining step further includes fixed filter matched signals that correspond to the coded symbol with delay of P symbols relative to the first coded symbol and wherein P+1 is the smallest integer multiple of L that satisfies the constraint $P+1 \geq I+C+L-1$.

6. The method of claim 5 wherein the number of receive signals is D>1 and the estimating step further includes:

calculating a channel vector for each of the $K_T D$ transmission paths; and wherein the symbol combining step further includes;

generating for each of the D receive signals a diversity fixed filter matched signal vector; and wherein the channel processing step further includes:

computing a dot product between a channel vector and the respective diversity fixed filter matched signal vector.

7. The method of claim 6 wherein the data symbols are selected from the MPSK set and the computing step further includes:

storing precalculated spectrum control correlation matrices that depend on a continuous set of multipath delays;

matrix multiplying the spectrum control correlation matrices by channel parameters to provide forward and backward transfer matrices;

parameter processing the forward and backward transfer matrices to provide the respective forward and backward weights;

and wherein the estimating step further includes:

statistically calculating diversity correlation for use in antenna alignment.

8. For use in a high data rate communication system, wherein digital data information is error-corrected coded and interleaved to provide information symbols that are subsequently time-division multiplexed with reference symbols to provide a frame of data symbols that are filtered with a finite duration spectrum control impulse response for transmission at the data symbol rate by one or more transmit antennas over a fading dispersive channel with an associated set of multipath delays, a receiving apparatus(12), connected to one or more receive antennas that produce one or more received signals, comprising:

down-converter(30) for time-sampling the received signals at an integer multiple, greater than one, of the data symbol rate to provide received vectors within a receiver time block that has a time duration that is no more than one-half of the interleaving delay;

fixed filter correlator(50) for correlating the received vectors and the spectrum control impulse response to provide fixed filter correlated signals;

symbol combiner(51) for combining the fixed filter correlated signals to provide nonstationary fixed filter matched signals, that depend on an estimation interval, of duration equal to the data symbol rate reciprocal, associated with the estimation of a respective information symbol and the nonstationary fixed matched filter signals correspond to information symbols transmitted at the same time and later than the respective information symbol;

channel estimator(32) for combining the reference symbols and the nonstationary fixed filter matched signals to provide channel parameters associated with the receiver time block;

channel matched filter(52) for combining the nonstationary fixed filter matched signals and channel parameters to provide channel matched signals;

equalizer calculator(33) for computing forward and backward transfer matrices that are functions of the spectrum control impulse response and the channel parameters and for processing the forward and backward transfer matrices to provide respective forward and backward filter weights;

backward filter(42) for creating past interference signals that depend on the estimation interval;

forward filter(41) for multiplying the channel matched signals and the forward filter weights to provide multiplication products and for combining the multiplication products with the past interference signals to provide information symbol estimates for successive estimation intervals within the data frame;

detector(43) for selecting, at the data symbol rate, from the information symbol estimate an information symbol decision corresponding to the closest possibly transmitted information symbol;

deinterleaver and decoder(34) for reconstructing the digital data information from information symbol estimates;

and wherein the backward filter(42) further includes:

backward filter branch(62) for multiplying the backward filter weights and the information symbol decisions from previous estimation intervals to provide the past interference signals.

9. A receiver apparatus(12) according to claim 8 wherein the channel estimator further includes:
   coarse channel selector(71) for multiplying the nonstationary fixed filter matched signals by the reference symbols to provide coarse channel parameters;
   correction matrix calculator(72) for processing the reference symbols to provide a correction matrix;
   channel vector calculator(73) for multiplying the correction matrix and coarse channel parameters to provide the channel parameters.

10. For use in a high data rate communication system, wherein digital data information is error-corrected coded and interleaved to provide groups of K information symbols that are block coded according to a space-time codebook to produce successive groups of $K_T \geq K$ code blocks containing $L \geq K_T$ coded symbols that are subsequently time-division multiplexed with $K_T$ respective reference symbol sequences to provide $K_T$ frames of data symbols that are each filtered with a finite duration spectrum control impulse response for transmission at the data symbol rate from respective $K_T$ transmit antenna ports over a fading dispersive channel with an associated set of multipath delays, a receiving apparatus(12), connected to one or more receive antennas that produce one or more received signals, comprising:
   down-converter(30) for time-sampling the received signals at an integer multiple, greater than one, of the data symbol rate to provide received vectors within a receiver time block that has a time duration that is no more than one-half of the interleaving delay;
   fixed filter correlator(50) for correlating the received vectors and the spectrum control impulse response to provide fixed filter correlated signals;
   symbol combiner(51) for combining the fixed filter correlated signals to provide nonstationary fixed filter matched signals, that depend on an estimation interval, of duration equal to L times the data symbol rate reciprocal, associated with the estimation of K information symbols and the nonstationary fixed matched filter signals correspond to coded symbols transmitted at the same time or later than the first coded symbol in the associated code block;
   channel estimator(32) for combining reference symbols and nonstationary fixed filter matched signals to provide channel parameters associated with the receiver time block;
   channel matched filter(52) for combining the fixed filter matched signals and channel parameters to provide coded matched signals and for decoding the coded matched signals to provide the channel matched signals;
   equalizer calculator(33) for matrix multiplying spectrum control correlation matrices that depend on the set of multipath delays and channel parameter matrices to provide forward and backward transfer matrices and for processing the forward and backward transfer matrices to provide respective forward and backward filter weights;
   backward filter(42) for creating past interference signals that depend on the estimation interval;
   forward filter(41) for multiplying the channel matched signals and the forward filter weights to provide multiplication products and for combining the multiplication products with the past interference signals to provide information symbol estimates for successive estimation intervals within the data frame;
   detector(43) for quantizing each information symbol estimate to provide an information symbol decision that corresponds to the closest possibly transmitted information symbol.
   deinterleaver and decoder(34) for reconstructing the digital data information from information symbol estimates;
   and wherein the backward filter(42) further includes:
      K backward filter branches(62) for multiplying the backward filter weights and the information symbol decisions from previous estimation intervals to provide the past interference signals.

11. A receiver apparatus(12) according to claim 10 wherein the equalizer calculator(33) further includes:
    means for computing forward and backward filter weights that minimize the mean square error between the information symbol estimate and the associated information symbol.

12. A receiver apparatus(12) according to claim 11 wherein the number of receive signals is $D \geq 1$ and the channel estimator(32) further includes:
    means for estimating a channel vector for each of the $K_T D$ transmission paths; and
    wherein the symbol combiner(51) further includes;
       means for generating for each of the D receive signals a diversity fixed filter matched signal vector; and
    wherein the channel matched filter(52) further includes:
       means for computing a dot product between a channel vector and the respective diversity fixed filter matched signal vector.

13. A receiver apparatus(12) according to claim 12 wherein the symbol combiner(51) further includes fixed filter matched signals that correspond to the coded symbol with delay of P symbols relative to the first coded symbol and wherein P+1 is the smallest integer multiple of L that satisfies the constraint $P+1 \geq I+C+L-1$ where the duration of the spectrum control impulse spans I data symbols and the set of multipath delays spans a duration of C data symbols.

14. A receiver apparatus(12) according to claim 13 wherein the equalizer calculator(51) further includes:
    means for storing constant spectrum control matrices that are functions of a continuous set of multipath delays.

15. In a high data rate communication receiver, wherein received signals contain digital data information that is error-corrected coded and interleaved to provide information symbols that are subsequently combined with reference symbols to provide a frame of data symbols that are filtered with a finite duration spectrum control impulse response for transmission at the data symbol rate by one or more transmit antennas over a fading dispersive channel with an associated set of multipath delays, a method of operating said receiver to enable said receiver to provide receive signals from one or more receive antennas and to produce within a data frame successive information symbol estimates that are subsequently used to reconstruct the digital data information, comprising the steps of:
    time-sampling the received signals at an integer multiple, greater than one, of the data symbol rate to provide received vectors within a receiver time block that has a time duration that is no more than one-half of the interleaving delay;
    correlating the received vectors and the spectrum control impulse response to provide fixed filter correlated signals;
    symbol combining the fixed filter correlated signals to provide nonstationary fixed filter matched signals, that depend on an estimation interval, corresponding to one or more information symbols and with duration equal to an integer multiple of the data symbol rate reciprocal, and that further depend on data symbol intervals within and later than the estimation interval;

estimating channel parameters associated with the receiver time block that depend on products of the reference symbols and the nonstationary fixed filter matched signals;

creating past interference signals that depend on the estimation interval;

channel processing the nonstationary fixed filter matched signals and the channel parameters to provide channel matched signals;

computing forward and backward filter weights that functionally depend on the channel parameters;

multiplying the channel matched signals and the forward filter weights to provide the information symbol estimates;

deinterleaving and decoding the information symbol estimates;

selecting, from each estimation interval containing one or more information symbol estimates, associated information symbol decisions corresponding to possible transmitted information symbols; and wherein the creating step further includes:
multiplying the backward filter weights and the information symbol decisions from previous estimation intervals.

wherein the channel processing step further includes:
channel combining the nonstationary fixed filter matched signals and channel parameters to provide combined matched signals;
intersymbol-interference combining the combined matched signals and the past interference signals to provide the channel matched signals.

16. A method for operating a high data rate communication system wherein at a transmitting terminal digital data information is error-correction coded and interleaved over an interleaver duration to provide information symbols within a periodic data frame for transmission over a fading dispersive channel and wherein at a receiving terminal information symbol estimates are produced from received signals, comprising:

at the transmitting terminal the steps of:
coding two information symbols according to a space-time codebook to provide two code blocks containing coded symbols;
transmitting at the same polarization the two code blocks at a coded symbol rate on respective antenna ports associated with two vertically splayed transmit beams; and at the receiving terminal the steps of:
receiving at the same polarization two diversity signals from respective antenna ports associated with two vertically splayed receive beams;
time-sampling the diversity signals at an integer multiple, greater than one, of the coded symbol rate;
estimating angle diversity channel parameters associated with each of the four transmit and receive beam combinations;
processing the time-sampled diversity signals with angle diversity channel parameters to provide four respective diversity nonstationary matched signals;
summing diversity nonstationary matched signals associated with the same transmit beam to provide coded matched signal vectors;
multiplying the coded matched signals and a decoder matrix that depends on the space-time codebook to provide channel matched signals;
equalizing the channel matched signals to provide successive groups each containing two information symbol estimates that depend on quantized information estimates from previous groups.

17. The method of claim 16 wherein the transmitting and receiving terminals are collocated and operate with simultaneous-in-time transmitting and receiving signals that have respectively different frequency bands.

18. The method of claim 17 wherein the transmitting and receiving frequency bands are periodically changed with a frequency hop period that is equal to the data frame period and is no more than one-half the interleaver duration.

19. The method of claim 17 wherein the transmitting frequency band has a bandwidth that is greater than the coded symbol rate.

20. A method for operating a high data rate communication system wherein at a transmitting terminal digital data information is error-correction coded and interleaved over an interleaver duration into information symbols within a periodic data frame for transmission over a fading dispersive channel and wherein at a receiving terminal information symbol estimates are produced from received signals, comprising:

at the transmitting terminal the steps of:
coding two information symbols according to a space-time codebook to provide two code blocks containing coded symbols;
transmitting at the same polarization the two code blocks at a coded symbol rate on the lower of two vertically splayed transmit beams associated with respective horizontally separated antennas; and at the receiving terminal the steps of:
receiving at the same polarization four diversity signals from respective antenna ports associated with two vertically splayed receive beams on each of two horizontally separated antennas;
time-sampling the diversity signals at an integer multiple, greater than one, of the coded symbol rate;
estimating angle diversity channel parameters associated with each of the eight transmit and receive beam combinations;
processing the time-sampled diversity signals by angle diversity channel parameters to provide eight respective diversity nonstationary matched signals;
summing diversity nonstationary matched signals associated with the same transmit antenna to provide coded matched signal vectors;
multiplying the coded matched signals and a decoder matrix that depends on the space-time codebook to provide channel matched signals;
equalizing the channel matched signals to provide successive groups each containing two information symbol estimates that depend on quantized information estimates from previous groups.

21. The method of claim 20 wherein the transmitting and receiving terminals are collocated and operate with simultaneous-in-time transmitting and receiving signals that have respectively different frequency bands.

22. The method of claim 21 wherein the transmitting and receiving frequency bands are periodically changed with a frequency hop period that is equal to the data frame period and is no more than one-half the interleaver duration.

23. The method of claim 21 wherein the transmitting frequency band has a bandwidth that is greater than the coded symbol rate.

24. For use in a high data rate communication system, wherein digital data information is error-corrected coded and interleaved over an interleaver duration to provide information symbols within a periodic data frame, a radio terminal apparatus(80) comprising:

- dual-beam antenna (81) with two antenna ports that contain transmitting and receiving signals that have the same polarization for a particular transmission direction and each port is associated one of two vertically splayed beams;
- modulator (22) for coding successive groups of two information symbols into successive groups of two space-time code blocks and each of the two space-time code blocks is associated with a respective vertically splayed beam;
- spectrum control filter (24) for filtering data symbols associated with respective space-time code blocks to provide respective data signals that are contained within a prescribed bandwidth;
- up-converter(25) for translating to a bandpass frequency band respective data signals for transmission as a transmitting signal on a respective vertically splayed beam;
- down-converter(30) for translating a receiving signal associated with a respective vertically splayed beam to provide respective beam diversity signals;
- duplexer (82) for separating the transmitting signals from the receiving signals;
- channel estimator (32) for estimating angle diversity channel parameters of each of four paths corresponding to combinations of the two receive vertically splayed beams and two transmit vertically splayed beams associated with a distant radio terminal (30);
- decision-feedback equalizer (31) for combining the angle diversity channel parameters and beam diversity signals to provide successive groups each containing two information symbol estimates that depend on quantized information estimates from previous groups.

25. A radio terminal apparatus according to claim 24 wherein up-converter (25) further includes:

- means for periodically changing the center frequency of the bandpass frequency band with a frequency hop period that is equal to the data frame period and is no more than one-half the interleaver duration.

26. A radio terminal apparatus according to claim 24 wherein the interleaver duration is at least two data frame periods and the spectrum control filter (24) further includes;

- means for multiplying the data symbols by a direct sequence waveform before filtering to the prescribed bandwidth.

* * * * *